US010891714B2

(12) United States Patent
Eble et al.

(10) Patent No.: US 10,891,714 B2
(45) Date of Patent: Jan. 12, 2021

(54) ERROR CONCEALMENT FOR A HEAD-MOUNTABLE DEVICE

(71) Applicant: Apple Inc., Cupertino, CA (US)

(72) Inventors: Tobias Eble, Sunnyvale, CA (US); Jim C. Chou, San Jose, CA (US); Jian Zhou, Pleasanton, CA (US); Moinul Khan, San Jose, CA (US); Hariprasad Puthukkootil Rajagopal, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/681,631

(22) Filed: Nov. 12, 2019

(65) Prior Publication Data

US 2020/0082498 A1 Mar. 12, 2020

Related U.S. Application Data

(63) Continuation of application No. 16/015,788, filed on Jun. 22, 2018, now Pat. No. 10,521,881.

(60) Provisional application No. 62/564,808, filed on Sep. 28, 2017.

(51) Int. Cl.
*G06T 3/00* (2006.01)
*G02B 27/01* (2006.01)
*G06T 7/593* (2017.01)
*G06T 5/00* (2006.01)

(52) U.S. Cl.
CPC .......... *G06T 3/0093* (2013.01); *G02B 27/017* (2013.01); *G06T 5/003* (2013.01); *G06T 7/593* (2017.01); *G02B 2027/014* (2013.01); *G02B 2027/0138* (2013.01)

(58) Field of Classification Search
CPC ....... G06T 3/0093; G06T 7/593; G06T 5/003; G02B 27/017; G02B 2027/014; G02B 2027/0138
See application file for complete search history.

(56) References Cited

U.S. PATENT DOCUMENTS

| 10,372,205 B2* | 8/2019 | Young | G06F 3/013 |
| 2009/0002507 A1* | 1/2009 | Fukuhara | H01L 27/1464 |
| | | | 348/222.1 |
| 2010/0142827 A1* | 6/2010 | Fukuhara | H04N 19/436 |
| | | | 382/207 |

(Continued)

*Primary Examiner* — Ibrahim A Khan
(74) *Attorney, Agent, or Firm* — Fernando & Partners, LLP

(57) ABSTRACT

In various implementations, a method includes obtaining a first frame that is characterized by a first resolution associated with a first memory allocation. In some implementations, the method includes down-converting the first frame from the first resolution to a second resolution that is lower than the first resolution initially defining the first frame in order to produce a reference frame. In some implementations, the second resolution is associated with a second memory allocation that is less than a target memory allocation derived from the first memory allocation. In some implementations, the method includes storing the reference frame in a non-transitory memory. In some implementations, the method includes obtaining a second frame that is characterized by the first resolution. In some implementations, the method includes performing an error correction operation on the second frame based on the reference frame stored in the non-transitory memory.

20 Claims, 23 Drawing Sheets

(56) References Cited

U.S. PATENT DOCUMENTS

| | | | |
|---|---|---|---|
| 2010/0232723 A1* | 9/2010 | Averbuch | H04N 19/63 382/244 |
| 2012/0039194 A1* | 2/2012 | Kure | H04N 19/30 370/252 |
| 2013/0121421 A1* | 5/2013 | Bruns | H04N 19/436 375/240.25 |
| 2013/0136218 A1* | 5/2013 | Kure | H04L 7/0041 375/356 |
| 2015/0287158 A1* | 10/2015 | Cerny | G06T 15/10 345/553 |
| 2016/0267884 A1* | 9/2016 | Binstock | G09G 5/373 |
| 2017/0132757 A1* | 5/2017 | Thiebaud | G06K 9/00604 |
| 2017/0155924 A1* | 6/2017 | Gokhale | H04N 19/1883 |
| 2017/0201760 A1* | 7/2017 | Newman | H04N 19/44 |
| 2018/0035134 A1* | 2/2018 | Pang | H04N 5/247 |
| 2018/0068640 A1* | 3/2018 | Martin | G06K 9/0061 |
| 2018/0096471 A1* | 4/2018 | Wilson | G02B 27/0172 |
| 2018/0232955 A1* | 8/2018 | Namgoong | G02B 27/017 |
| 2018/0350032 A1* | 12/2018 | Bastani | G06T 15/20 |
| 2018/0350036 A1* | 12/2018 | VanReenen | G06T 15/20 |
| 2019/0005884 A1* | 1/2019 | Yoo | G09G 3/3266 |
| 2019/0037244 A1* | 1/2019 | Melkote Krishnaprasad | H04N 19/172 |
| 2019/0094981 A1* | 3/2019 | Bradski | G02B 27/0093 |
| 2019/0273910 A1* | 9/2019 | Malaika | H04N 13/332 |

* cited by examiner

US 10,891,714 B2

ERROR CONCEALMENT FOR A HEAD-MOUNTABLE DEVICE

CROSS-REFERENCE TO RELATED APPLICATIONS

This application is a continuation of U.S. patent application Ser. No. 16/015,788, filed on Jun. 22, 2018, which claims priority to U.S. Provisional Patent App. No. 62/564,808, filed on Sep. 28, 2017, both of which are hereby incorporated by reference in their entirety.

TECHNICAL FIELD

The present disclosure generally relates to error concealment for a head-mountable device.

BACKGROUND

A head-mountable device is a display device that is worn on or around the head of a user. Head-mountable devices are available in a variety of different form factors. For example, some head-mountable devices resemble a helmet, whereas other head-mountable devices resemble a pair of eyeglasses. Most head-mountable devices include at least one display that the user can view when the head-mountable device is worn by the user. Some head-mountable devices include multiple displays. For example, some head-mountable devices include two displays, one for each eye. Head-mountable devices have a variety of applications. For example, head-mountable devices are often used in gaming, aviation, engineering and medicine.

Since a head-mountable device is in such close proximity to the user when the head-mountable device is being used, the amount of heat that the head-mountable device generates may need to be controlled. The amount of heat that the head-mountable device generates typically correlates to the amount of power consumed by the head-mountable device. As such, the amount of power that the head-mountable device consumes may need to be controlled. Typically, the amount of power consumed by a head-mountable device depends on the hardware and/or software capabilities of the head-mountable device. For example, a head-mountable device with higher processing power, a larger memory and/or a faster refresh rate typically consumes more power than a head-mountable device with lower processing power, a smaller memory and/or a slower refresh rate. However, limiting the hardware and/or software capabilities of the head-mountable device usually hampers performance of the head-mountable device and/or degrades the user experience.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
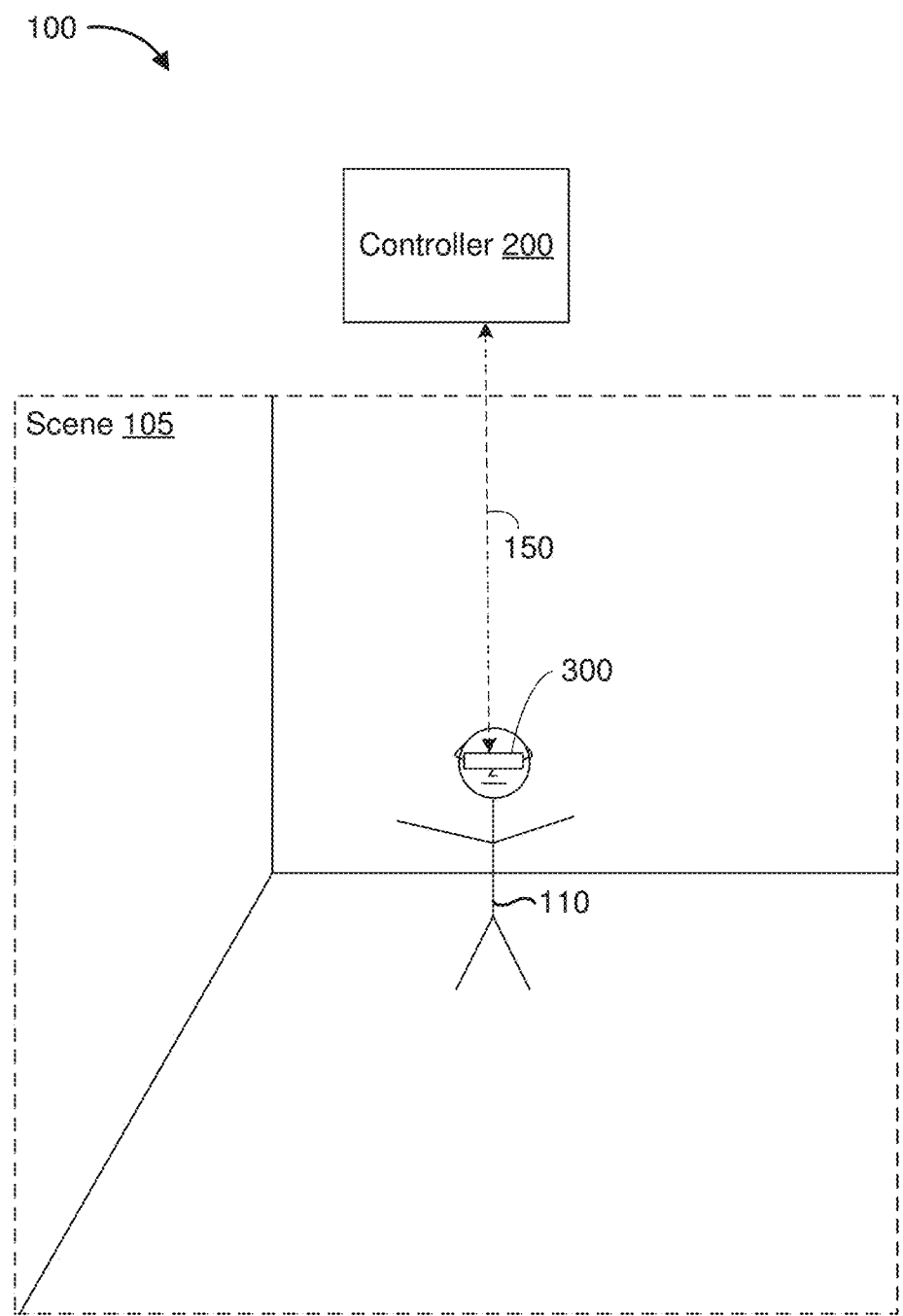
FIG. 1 is a schematic diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for performing error concealment at a head-mountable device (HMD). In various implementations, the HMD includes a display, a non-transitory memory, and one or more processors coupled with the display and the non-transitory memory. In some implementations, the method includes obtaining a first frame that is characterized by a first resolution associated with a first memory allocation. In some implementations, the method includes down-converting the first frame from the first resolution to a second resolution that is lower than the first resolution initially defining the first frame in order to produce a reference frame. In some implementations, the second resolution is associated with a second memory allocation that is less than a target memory allocation derived from the first memory allocation. In some implementations, the method includes storing the reference frame in the non-transitory memory. In some implementations, the method includes obtaining a second frame that is characterized by the first resolution. In some implementations, the method includes performing an error correction operation on the second frame based on the reference frame stored in the non-transitory memory.

In accordance with some implementations, a device includes one or more processors, a non-transitory memory, and one or more programs. The one or more programs are stored in the non-transitory memory and are executed by the one or more processors. The one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In various implementations, a head-mountable device (HMD) includes a display. In some implementations, the display presents frames (e.g., video frames) that the HMD obtains. In some implementations, a current frame includes an error. For example, in some implementations, the current frame includes corrupted/damaged data, or the current frame is missing data. Presenting a frame with corrupted/damaged/missing data sometimes results in misshaped objects, dark lines across the display, and/or erroneous objects that are not present in the frame. As such, the HMD performs an error correction operation to compensate for the corrupted/damaged/missing data.

In various implementations, the HMD utilizes a previous frame to perform the error correction operation on the current frame. In some implementations, the HMD has a limited amount of memory, for example, because maintaining a relatively small memory lowers the power consumption of the HMD thereby reducing an amount of heat generated by the HMD. As such, in various implementations, storing frames at their native resolution is not feasible, for example, because storing the previous frame at its native resolution would require a memory allocation that exceeds a target memory allocation. In various implementations, the HMD down-converts the previous frame in order to produce a reference frame that has a memory allocation which is lower than the target memory allocation. In various implementations, the HMD utilizes the reference frame to perform the error correction operation on the current frame.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 200 and a head-mountable device (HMD) 300. In the example of FIG. 1, the HMD 300 is located at a scene 105 (e.g., a geographical location such as a meeting room). As illustrated in FIG. 1, the HMD 300 can be worn by a user 110.

In some implementations, the controller 200 is configured to manage and coordinate an augmented reality/virtual reality (AR/VR) experience for the user 110. In some implementations, the controller 200 includes a suitable combination of software, firmware, and/or hardware. The controller 200 is described in greater detail below with respect to FIG. 2. In some implementations, the controller 200 is a computing device that is local or remote relative to the scene 105. For example, in some implementations, the controller 200 is a local server located within the scene 105. In some implementations, the controller 200 is a remote server located outside of the scene 105 (e.g., a cloud server, central server, etc.). In some implementations, the controller 200 resides at a smartphone, a tablet, a personal computer, a laptop computer, or the like.

In some implementations, the controller 200 is communicatively coupled with the HMD 300 via one or more wired or wireless communication channels 150 (e.g., BLUETOOTH, IEEE 802.11x, IEEE 802.16x, IEEE 802.3x, etc.). In some implementations, the controller 200 is communicatively coupled with a calibration device (not shown) via one or more wired or wireless communication channels (e.g., BLUETOOTH, IEEE 802.11x, IEEE 802.16x, IEEE 802.3x, etc.). In some implementations, the HMD 300 is communicatively coupled with the calibration device via one or more wired or wireless communication channels (e.g., BLUETOOTH, IEEE 802.11x, IEEE 802.16x, IEEE 802.3x, etc.). In some implementations, the calibration device enables calibration of the controller 200 and/or the HMD 300. In some implementations, the calibration device includes a smartphone, a tablet, a personal computer, a laptop computer, or the like.

In some implementations, the HMD 300 is configured to present the AR/VR experience to the user 110. In some implementations, the HMD 300 includes a suitable combination of software, firmware, and/or hardware. The HMD 300 is described in greater detail below with respect to FIG. 3. In some implementations, the functionalities of the controller 200 are provided by and/or combined with the HMD 300.

According to some implementations, the HMD 300 presents an augmented reality/virtual reality (AR/VR) experience to the user 110 while the user 110 is virtually and/or physically present within the scene 105. In some implementations, while presenting an augmented reality (AR) experience, the HMD 300 is configured to present AR content and to enable optical see-through of the scene 105. In some implementations, while presenting a virtual reality (VR) experience, the HMD 300 is configured to present VR content.

In some implementations, the user 110 mounts the HMD 300 onto his/her head. For example, in some implementations, the HMD 300 includes a frame that the user 110 positions on his/her nose and ears. In some implementations, the HMD 300 includes a strap that the user 110 wears around his/her forehead or chin. In some implementations, the HMD 300 is attachable to or integrated into a helmet that the user 110 wears on his/her head. In some implementations, the HMD 300 is attachable to or integrated into a pair of eyeglasses that the user 110 wears.

In various implementations, the HMD 300 includes a display that presents frames (e.g., video frames) obtained by the HMD 300. In some implementations, the HMD 300 performs an error correction operation on a current frame based on a reference frame stored at the HMD 300. In various implementations, a resolution of the reference frame is less than a resolution of the current frame. In some implementations, the HMD 300 produces the reference frame by down-converting a previous frame. In other words, in some implementations, the reference frame is a down-converted version of the previous frame. In various implementations, the HMD 300 down-converts the previous frame because a memory allocation of the previous frame exceeds a target memory allocation. In various implementations, the HMD 300 produces the reference frame by down-converting the previous frame so that a memory allocation of the reference frame is less than the target memory allocation. In various implementations, generating a reference frame with a memory allocation that is less than the target memory allocation allows the HMD 300 to reduce power consumption and/or heat generation thereby improving performance of the HMD 300.

Figure 2:
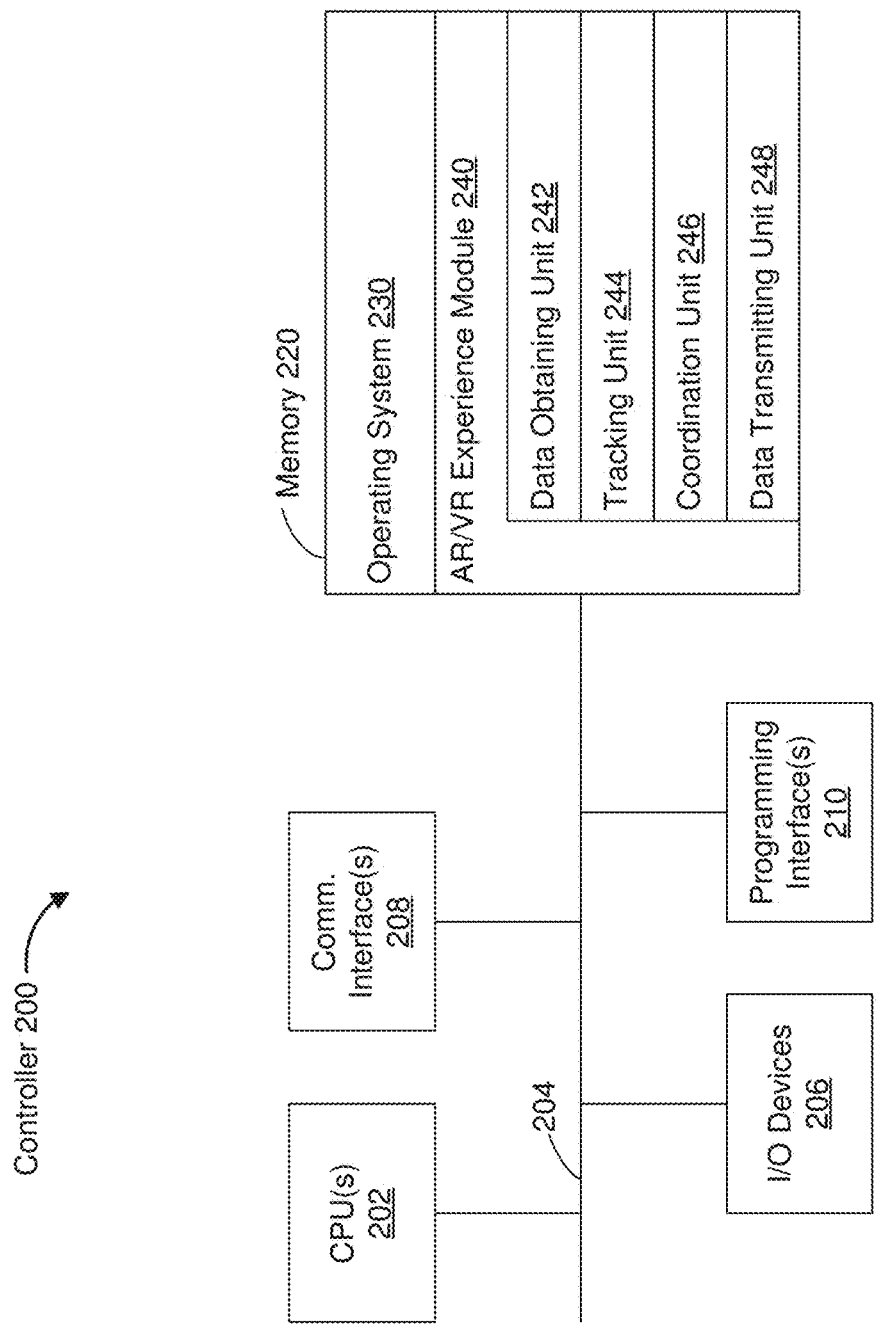
FIG. 2 is a block diagram of an example controller in accordance with some implementations.

FIG. 2 is a block diagram of an example of the controller 200 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 200 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, a touch-sensitive display, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. In some implementations, the memory 220 includes one or more storage devices remotely located from the one or more processing units 202. In some implementations, the memory 220 includes a non-transitory computer readable storage medium. In some implementations, the memory 220 or the non-transitory computer readable storage medium of the memory 220 stores the following programs, modules and data structures, or a subset thereof including an optional operating system 230 and an augmented reality/virtual reality (AR/VR) experience module 240.

The operating system 230 includes procedures for handling various basic system services and for performing hardware dependent tasks. In some implementations, the AR/VR experience module 240 manages and coordinates one or more AR/VR experiences for one or more users (e.g., a single AR/VR experience for one or more users, or multiple AR/VR experiences for respective groups of one or more users). To that end, in various implementations, the AR/VR experience module 240 includes a data obtaining unit 242, a tracking unit 244, a coordination unit 246, and a data transmitting unit 248.

In some implementations, the data obtaining unit 242 obtains data (e.g., presentation data, interaction data, sensor data, location data, etc.) from at least one of the HMD 300 and the calibration device. In some implementations, the data obtaining unit 242 obtains frames (e.g., video frames). To that end, in various implementations, the data obtaining unit 242 includes instructions and/or logic therefor, and heuristics and metadata therefor.

In some implementations, the tracking unit 244 maps the scene 105 and tracks the position/location of at least one of the HMD 300 and the calibration device with respect to the scene 105. To that end, in various implementations, the tracking unit 244 includes instructions and/or logic therefor, and heuristics and metadata therefor.

In some implementations, the coordination unit 246 manages and/or coordinates the AR/VR experience presented by the HMD 300. To that end, in various implementations, the coordination unit 246 includes instructions and/or logic therefor, and heuristics and metadata therefor.

In some implementations, the data transmitting unit 248 transmits data (e.g., presentation data, location data, etc.) to at least one of the HMD 300 and the calibration device. For example, in some implementations, the data transmitting unit 248 transmits frames (e.g., video frames) to the HMD 300. To that end, in various implementations, the data transmitting unit 248 includes instructions and/or logic therefor, and heuristics and metadata therefor.

In the example of FIG. 2, the data obtaining unit 242, the tracking unit 244, the coordination unit 246, and the data transmitting unit 248 are shown as residing on a single device (e.g., the controller 200). A person of ordinary skill in the art will appreciate that, in some implementations, the data obtaining unit 242, the tracking unit 244, the coordination unit 246, and the data transmitting unit 248 are embodied by (e.g., reside at) separate computing devices.

As recognized by those of ordinary skill in the art, items shown separately could be combined and some items could be separated. For example, some modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
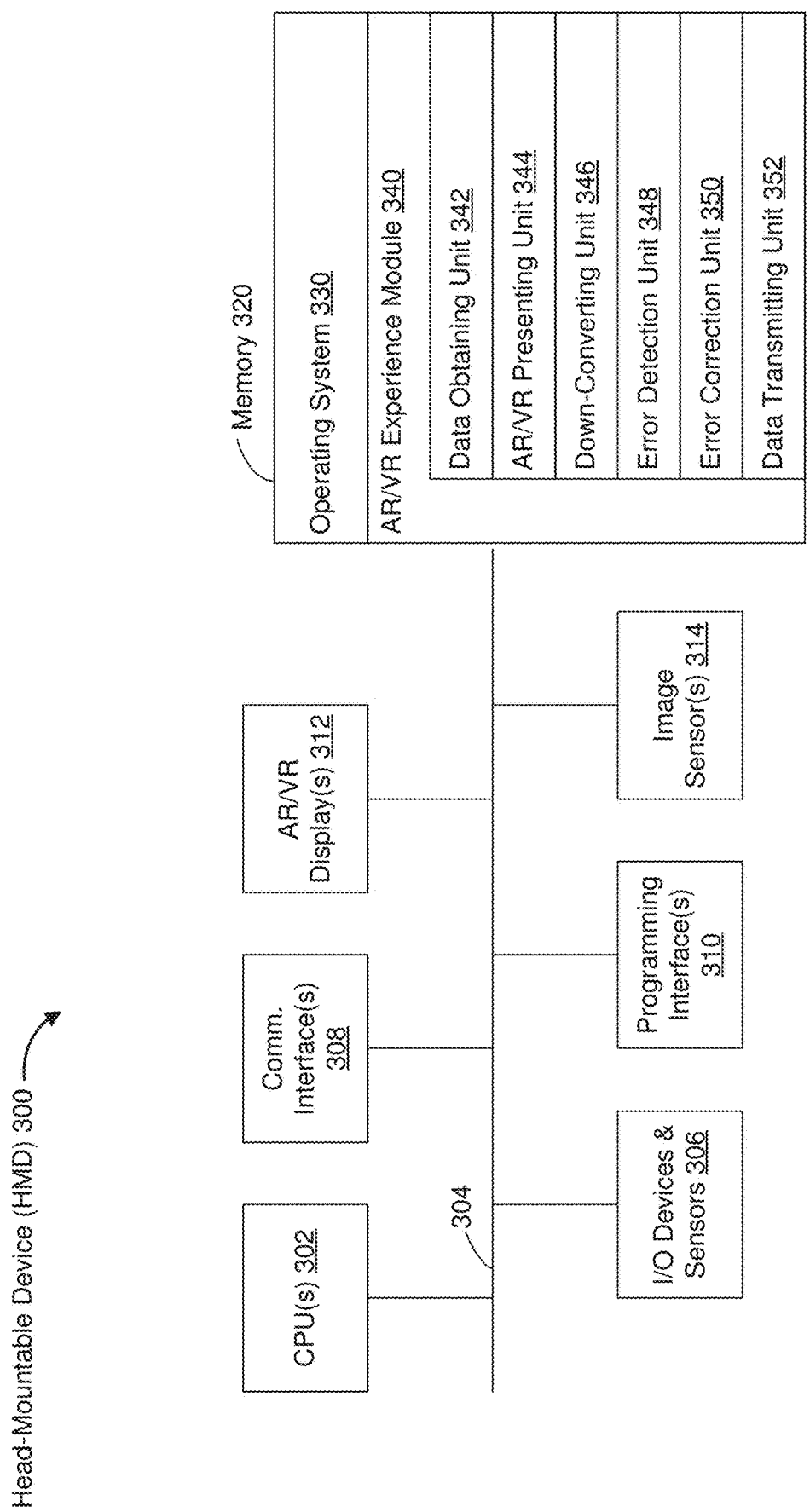
FIG. 3 is a block diagram of an example head-mountable device (HMD) in accordance with some implementations.

FIG. 3 is a block diagram of an example of the head-mountable device (HMD) 300 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 300 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBLOT, IEEE 802.3x, IEEE 802.11x, IEEE 802.16x, GSM, CDMA, TDMA, GPS, IR, BLUETOOTH, ZIGBEE, and/or the like), one or more programming (e.g., I/O) interfaces 310, one or more AR/VR displays 312, one or more image sensors 314 (e.g., one or more cameras), one or more optional depth sensors, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, and/or the like.

In some implementations, the one or more AR/VR displays 312 present the AR/VR experience to the user. In some implementations, the one or more AR/VR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more AR/VR displays 312 correspond to diffractive, reflective, polarized, holographic, waveguide displays, etc. In some implementations, the one or more AR/VR displays 312 are capable of presenting AR and VR content.

In some implementations, the one or more image sensors 314 include an event camera. As such, in some implementations, the one or more image sensors 314 output event image data in response to detecting a change in a field of view of the one or more image sensors 314. In some implementations, the event image data indicates changes in individual pixels. For example, the event image data indicates which pixel registered a change in its intensity. In some implementations, the one or more image sensors 314 include a depth camera. As such, in some implementations, the one or more image sensors 314 obtain depth data associated with a scene (e.g., the scene 105 shown in FIG. 1). In some implementations, the depth data indicates a distance between the HMD 300 and an object that is located at the scene. In some implementations, the depth data indicates a dimension of an object that is located at the scene. In various implementations, the one or more image sensors 314 utilize methods, devices and/or systems that are associated with active depth sensing to obtain the depth data. In some implementations, the one or more image sensors 314 include a scene-facing image sensor. In such implementations, a field of view of the scene-facing image sensor includes a portion of the scene 105. In some implementations, the one or more image sensors 314 include a user-facing image sensor. In such implementations, a field of view of the user-facing image sensor includes a portion of the user 110 (e.g., one or more eyes of the user 110).

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330, and an AR/VR experience module 340.

In some implementations, a size of the memory 320 affects (e.g., is directly proportional to) an amount of power consumed by the HMD 300, an amount of heat generated by the HMD 300, and/or a weight of the HMD 300. As such, in some implementations, the size of the memory 320 is limited in order to reduce the power consumption of the HMD 300, reduce the heat generated by the HMD 300 and/or reduce the weight of the HMD 300. In some implementations, a size of the memory 320 allocated to store data (e.g., frames such as video frames) affects (e.g., is directly proportional to) an amount of power consumed by the HMD 300, an amount of heat generated by the HMD 300, and/or a weight of the HMD 300. As such, in some implementations, the size of the memory 320 allocated to store data (e.g., frames such as video frames) is limited by a target memory allocation. In various implementations, the target memory allocation is less than a memory allocation for a frame that the HMD 300 obtains. In other words, in various implementations, an amount of memory available for storing a frame is less than an amount of memory required to store the frame at a resolution that initially defines the frame.

The operating system 330 includes procedures for handling various basic system services and for performing hardware dependent tasks. In some implementations, the AR/VR experience module 340 presents AR/VR content to the user via the one or more AR/VR displays 312. To that end, in various implementations, the AR/VR experience module 340 includes a data obtaining unit 342, an AR/VR presenting unit 344, a down-converting unit 346, an error detection unit 348, an error correction unit 350, and a data transmitting unit 352.

In some implementations, the data obtaining unit 342 obtains data (e.g., video data, presentation data, interaction data, sensor data, location data, etc.). For example, in some implementations, the data obtaining unit 342 receives data from at least one of the controller 200 and the calibration device. In some implementations, the data obtaining unit 342 obtains video data. For example, in some implementations, the data obtaining unit 342 receives video frames from the controller 200. In some implementations, the data obtaining unit 342 obtains data that is already stored in the memory 320 (e.g., by retrieving the stored data from the memory 320). In some implementations, the data obtaining unit 342 obtains data from the image sensor(s) 314. For example, the data obtaining unit 342 obtains frames captured by the image sensor(s) 314. To that end, in various implementations, the data obtaining unit 342 includes instructions and/or logic therefor, and heuristics and metadata therefor.

In some implementations, the AR/VR presenting unit 344 presents AR/VR content via the one or more AR/VR displays 312. In some implementations, the AR/VR presenting unit 344 renders frames on the AR/VR display(s) 312. For example, in some implementations, the AR/VR presenting unit 344 utilizes the data (e.g., video data) obtained by the data obtaining unit 342 to present video frames on the AR/VR display(s) 312. To that end, in various implementations, the AR/VR presenting unit 344 includes instructions and/or logic therefor, and heuristics and metadata therefor.

In various implementations, the down-converting unit 346 down-converts a first frame from a first resolution to a second resolution that is lower than the first resolution that initially defines the frame in order to produce a reference frame. In some implementations, the first frame has a first memory allocation that is greater than a target memory allocation. In other words, storing the first frame at the first resolution occupies an amount of memory that is greater than the target memory allocation. In some implementations, the reference frame has a second memory allocation that is less than the target memory allocation. In other words, storing the reference frame at the second resolution occupies an amount of memory that is less than the target memory allocation. In various implementations, the down-converting unit 346 stores the reference frame in the memory 320.

In some implementations, the first frame is associated with various frequency bands. For example, in some implementations, a wavelet filter (e.g., a two-dimensional (2D) wavelet filter) divides the frame into a number of frequency bands. In such implementations, the down-converting unit 346 down-converts the first frame by selecting a portion of the frequency bands associated with the first frame (e.g., one of the frequency bands associated with the first frame), and discarding the remainder of the frequency bands. For example, in some implementations, the down-converting unit 346 selects the lowest frequency band associated with the first frame. In such implementations, the down-converting unit 346 stores the lowest frequency band of the first frame as the reference frame. In some implementations, the HMD 300 receives the different frequency bands of the first frame. In some implementations, the wavelet filter resides at the HMD 300 (e.g., in the down-converting unit 346), and the HMD 300 passes the first frame through the wavelet filter to segregate the first frame into the different frequency bands.

In various implementations, the down-converting unit 346 includes instructions and/or logic, and heuristics and metadata for performing the operations described herein.

In various implementations, the error detection unit 348 detects an error in a frame. In some implementations, the error detection unit 348 detects errors in a frame by determining whether the frame includes data that is damaged/corrupted. In some implementations, the error detection unit 348 detects errors in a frame by determining whether the frame is missing data. In some implementations, the error detection unit 348 determines that a frame does not include errors, or that the error(s) in the frame are less than an error threshold. In such implementations, the error detection unit 348 indicates to the AR/VR presenting unit 344 that the frame is ready for presentation. In some implementations, the error detection unit 348 determines that the frame includes errors, or that the error(s) in the frame exceed the error threshold. In such implementations, the error detection unit 348 invokes the error correction unit 350 to correct and/or conceal the error(s). In some implementations, in response to determining that the frame includes errors or that the error(s) in the frame exceed the error threshold, the error detection unit 348 indicates to the AR/VR presenting unit 344 that the frame is not ready for presentation. In various implementations, the error detection unit 348 includes instructions and/or logic, and heuristics and metadata for performing the operations described herein.

In various implementations, the error correction unit 350 performs an error correction operation on a frame when the error detection unit 348 detects an error in the frame. As used herein, in some implementations, an error correction operation includes an error concealment operation. In some implementations, the error correction unit 350 performs the error correction operation to compensate for damaged/corrupted/missing data in a frame. In various implementations, the error correction unit 350 performs the error correction operation on a frame based on the reference frame stored in the memory 320. In various implementations, the error correction unit 350 performs the error correction operation on a frame that is characterized by a first resolution based on the reference frame that is characterized by a second resolution which is lower than the first resolution. In other words, in various implementations, the error correction unit 350 utilizes the reference frame characterized by the second resolution to correct (e.g., conceal) an error in a frame that is characterized by the first resolution which is higher than the second resolution.

In various implementations, the error correction unit 350 performs a blurring operation on the frame based on the reference frame stored in the memory 320. For example, in some implementations, the error correction unit 350 determines that data corresponding to a particular portion of the frame is damaged/corrupted/missing. In such implementations, the error correction unit 350 generates/synthesizes that particular portion of the frame based on the corresponding portion of the reference frame.

In various implementations, the error correction unit 350 performs a warping operation on the frame based on the reference frame. In various implementations, performing a warping operation on the frame based on the reference frame refers to digitally manipulating the frame to selectively incorporate features of the reference frame. In some implementations, the error correction unit 350 performs a rotational warping operation on the frame based on the reference frame. In other words, in some implementations, the error correction unit 350 utilizes the reference frame to rotationally warp the frame. In some implementations, the error correction unit 350 performs the rotational warp when depth data associated with the scene is unavailable. For example, the error correction unit 350 performs the rotational warping operation when the HMD 300 does not have access to a model (e.g., a three-dimensional (3D) model) of the scene. In some implementations, the error correction unit 350 performs the rotational warping operation when a channel (e.g., the communication channel 150 shown in FIG. 1) is lossy and the HMD 300 is unable to receive the depth data. In some implementations, the error correction unit 350 performs the rotational warping operation when the reference frame does not include depth data associated with the scene.

In some implementations, the error detection unit 348 detects that the error persists after the error correction unit 350 performs the rotational warping operation on the frame. In such implementations, the AR/VR presenting unit 344 alternates presentation of frames between two AR/VR displays 312. In some implementations, the AR/VR displays 312 include a first display that displays a first video stream and a second display that displays a second video stream. In such implementations, the error correction unit 350 temporally shifts the second video stream relative to the first stream so that a majority of refresh times of the first display are different from refresh times of the second display. In some implementations, alternating presentation of frames between the two AR/VR displays 312 reduces the impact of the error, for example, by reducing the likelihood of the errors being noticed.

In some implementations, the error correction unit 350 performs a translational warping operation on the frame based on the reference frame. In other words, in some implementations, the error correction unit 350 utilizes the reference frame to perform the translational warping operation on the frame. In some implementations, the error correction unit 350 performs the translational warping operation on the frame when the error correction unit 350 has access to depth data associated with the scene. For example, in some implementations, the error correction unit 350 performs the translational warping operation when the reference frame includes depth data associated with the scene. In some implementations, the error correction unit 350 performs the translational warping operation when the channel (e.g., the communication channel 150 shown in FIG. 1) is sufficiently robust to reliably deliver depth data to the HMD 300.

In some implementations, the error correction unit 350 performs the warping operation (e.g., the translational warping operation) based on depth data indicated by the frame that is being operated on (e.g., the frame that has the error(s)). In some implementations, the error correction unit 350 performs the warping operation (e.g., the translational warping operation) based on depth data indicated by the reference frame.

In some implementations, the error correction unit 350 performs a positional warping operation on the frame based on the reference frame. In some implementations, the error correction unit 350 performs the positional warping operation by performing a combination of a rotational warping operation and a translational warping operation. In some implementations, the error correction unit 350 performs the positional warping operation when the HMD 300 has access to depth data associated with the scene.

In some implementations, after performing the error correction operation, the error correction unit 350 indicates to the AR/VR presenting unit 344 that the frame is ready for presentation. As such, after the error correction unit 350 performs the error correction operation, the AR/VR presenting unit 344 presents the frame on the AR/VR display(s) 312.

In various implementations, the error correction unit 350 includes instructions and/or logic, and heuristics and metadata for performing the operations described herein.

In some implementations, the data transmitting unit 352 transmits data (e.g., an indication of an error in a frame) to at least one of the controller 200 and the calibration device. To that end, in various implementations, the data transmitting unit 352 includes instructions and/or logic therefor, and heuristics and metadata therefor.

Although the data obtaining unit 342, the AR/VR presenting unit 344, the down-converting unit 346, the error detection unit 348, the error correction unit 350 and the data transmitting unit 352 are shown as residing on a single device (e.g., the HMD 300), it should be understood that in some implementations, any combination of the data obtaining unit 342, the AR/VR presenting unit 344, the down-converting unit 346, the error detection unit 348, the error correction unit 350 and the data transmitting unit 352 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
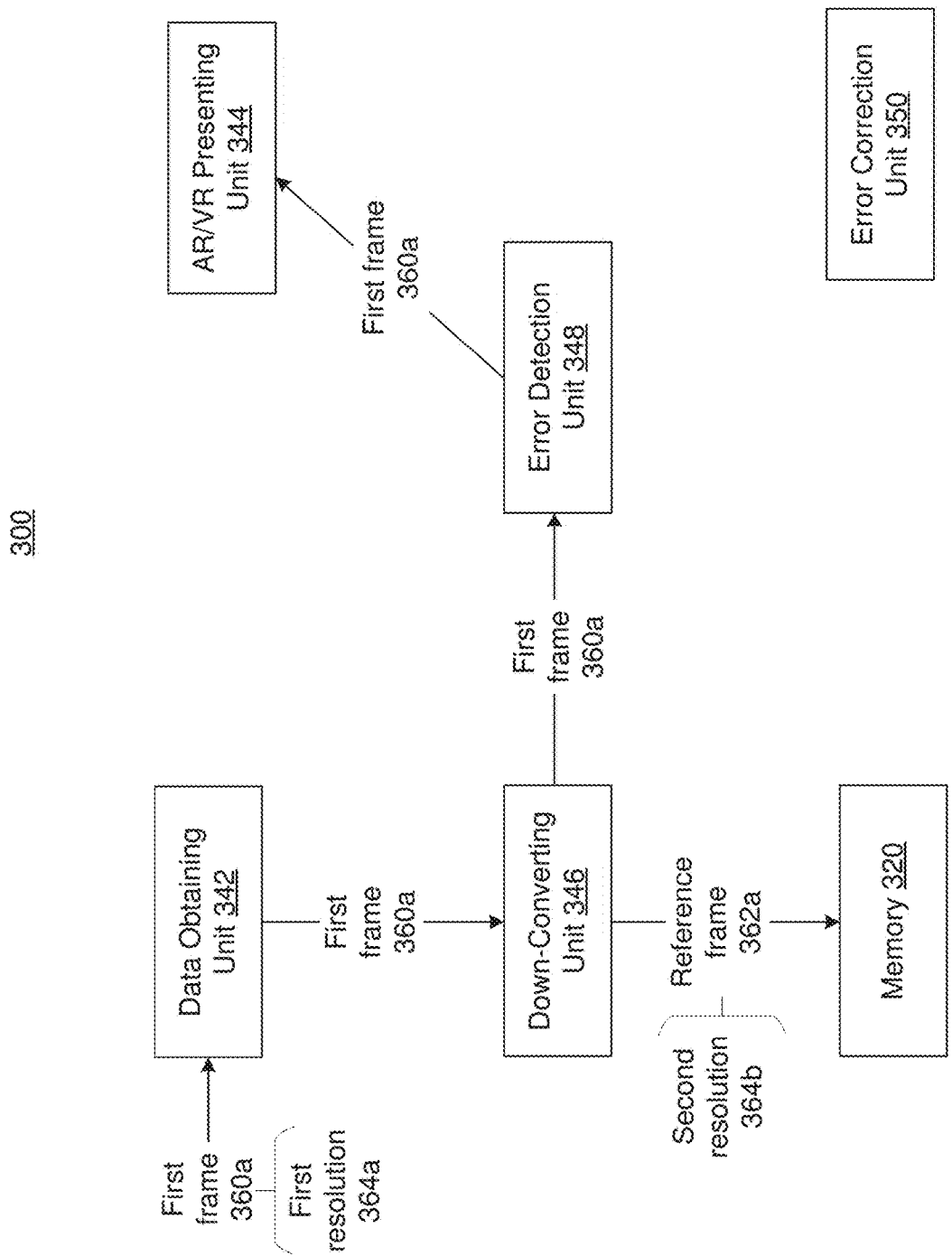
FIGS. 4A-4C are block diagrams of the HMD in accordance with some implementations.

FIG. 4A is a block diagram of the HMD 300 in accordance with some implementations. In various implementations, the data obtaining unit 342 obtains a first frame 360a that is characterized by a first resolution 364a. In some implementations, the first frame 360a represents an image with the first resolution 364a. In some implementations, the data obtaining unit 342 receives the first frame 360a from the controller 200 over the communication channel 150 shown in FIG. 1. In some implementations, the data obtaining unit 342 receives the first frame 360a from the image sensor(s) 314. In some implementations, the data obtaining unit 342 forwards the first frame 360a to the down-converting unit 346.

In various implementations, the down-converting unit 346 down-converts the first frame 360a from the first resolution 364a to a second resolution 364b that is lower than the first resolution 364a in order to produce a reference frame 362a. In some implementations, the first frame 360a is associated with various frequency bands. In such implementations, the down-converting unit 346 down-converts the first frame 360a by selecting a portion of the frequency bands. For example, in some implementations, the down-converting unit 346 selects the lowest frequency band associated with the first frame 360a to produce the reference frame 362a. In some implementations, the down-converting unit 346 passes the first frame 360a through a low pass filter to produce the reference frame 362a. In some implementations, the down-converting unit 346 re-samples the first frame 360a at a lower sampling rate to produce the reference frame 362a. As illustrated in FIG. 4A, the down-converting unit 346 stores the reference frame 362a in the memory 320.

In some implementations, the reference frame 362a has a memory allocation that is less than a memory allocation of the first frame 360a. For example, the first frame 360a has a first memory allocation that is greater than a target memory allocation, and the reference frame 362a has a second memory allocation that is less than the target memory allocation. In some implementations, the target memory allocation is a function of the first memory allocation associated with the first frame 360a. For example, in some implementations, the target memory allocation is a fraction (e.g., 90%, 75%, 50%, etc.) of the first memory allocation associated with the first frame 360a.

In various implementations, the error detection unit 348 determines whether there is an error in the first frame 360a. In some implementations, the error detection unit 348 determines whether the first frame 360a has damaged/corrupted data. In some implementations, the error detection unit 348 determines whether the first frame 360a is missing data. In some implementations, the error detection unit 348 determines whether one or more blocks of scanlines associated with the first frame 360a are damaged/corrupted/missing. In the example of FIG. 4A, the error detection unit 348 determines whether or not the first frame 360a includes errors, or whether or not the errors in the first frame 360a are less than an error threshold. In response to determining that the first frame 360a does not include errors, or in response to determining that the error are less than the error threshold, the error detection unit 348 forwards the first frame 360a to the AR/VR presenting unit 344.

In the example of FIG. 4A, the AR/VR presenting unit 344 receives the first frame 360a (e.g., from the error detection unit 348), and presents the first frame 360a on the AR/VR display(s) 312.

Figure 4B:
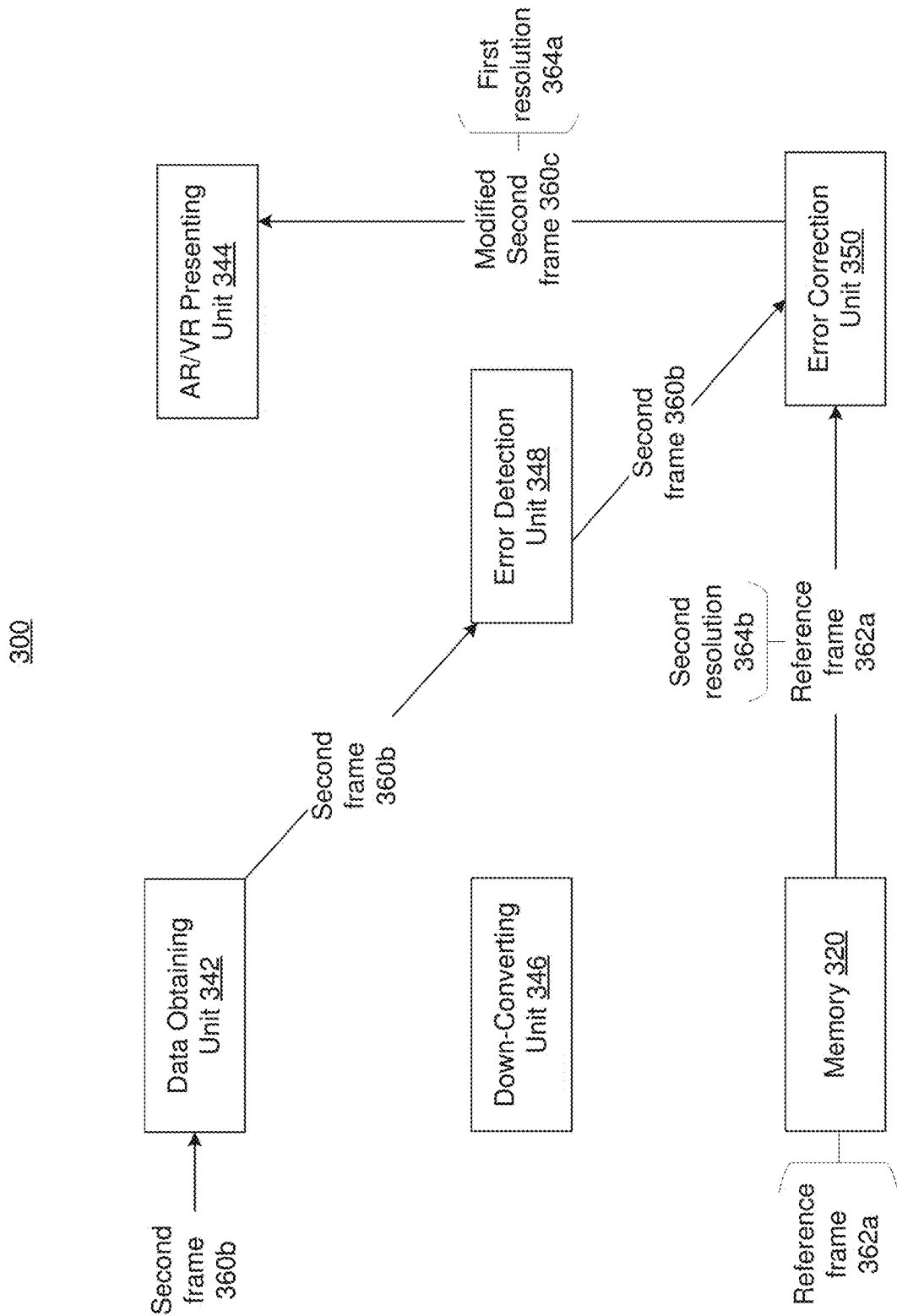

Referring to FIG. 4B, the data obtaining unit 342 obtains a second frame 360b. In the example of FIG. 4B, the data obtaining unit 342 forwards the second frame 360b to the error detection unit 348. As described herein, the error detection unit 348 determines whether the second frame 360b includes an error. In the example of FIG. 4B, the error detection unit 348 determines that the second frame 360b includes an error. As such, the error detection unit 348 forwards the second frame 360b to the error correction unit 350 for error correction.

In the example of FIG. 4B, the error correction unit 350 performs an error correction operation on the second frame 360b to produce a modified second frame 360c. In the example of FIG. 4B, the error correction unit 350 obtains the reference frame 362a from the memory 320, and utilizes the reference frame 362a to perform the error correction operation on the second frame 360b. As described herein, in some implementations, the error correction unit 350 performs a blurring operation on the second frame 360b. In some implementations, the error correction unit 350 performs a warping operation on the second frame 360b. In the example of FIG. 4B, the second frame 360b and the modified second frame 360c are characterized by the first resolution 364a while the reference frame 362a is characterized by the second resolution 364b which is lower than the first resolution 364a.

As illustrated in FIG. 4B, the error correction unit 350 sends the modified second frame 360c to the AR/VR presenting unit 344. The AR/VR presenting unit 344 presents the modified second frame 360c (e.g., instead of the second frame 360b) on the AR/VR display(s) 312.

In the example of FIG. 4B, the HMD 300 does not utilize the second frame 360b to produce a reference frame. In some implementations, the HMD 300 does not utilize a frame to produce a reference frame in response to determining that the frame includes an error. In some implementations, the HMD 300 does not produce a reference frame every time the HMD 300 obtains a frame. For example, in some implementations, the HMD 300 produces a reference frame less frequently than obtaining frames. In some implementations, the HMD 300 produces a reference frame for every other frame that the HMD 300 obtains. In some implementations, the HMD 300 produces a reference frame for every five frames that the HMD 300 obtains. More generally, in various implementations, the HMD 300 produces a reference frame after obtaining a threshold number of frames (e.g., after obtaining 3 frames, 5 frames, etc.).

Figure 4C:
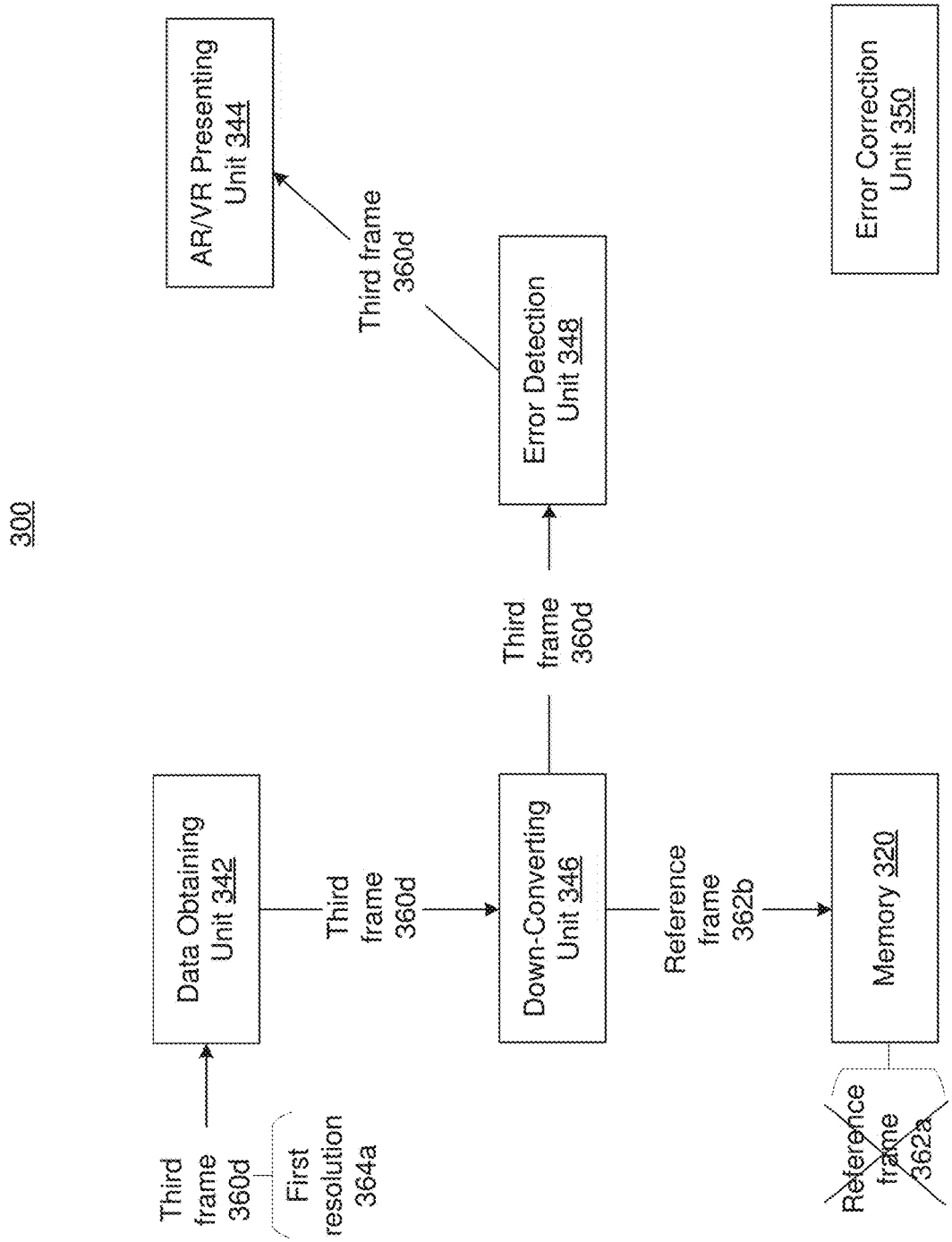

Referring to FIG. 4C, in some implementations, the down-converting unit 346 down-converts a third frame 360d to produce a new reference frame 362b. As illustrated in FIG. 4C, in some implementations, the down-converting unit 346 purges the old reference frame 362a from the memory 320 and stores the new reference frame 362b in the memory. More generally, in various implementations, the HMD 300 (e.g., the down-converting unit 346) updates the reference frame stored in the memory 320. In some implementations, the HMD 300 updates the reference frame periodically (e.g., every 3 frames, 5 frames, etc.). In some implementations, the HMD 300 updates the reference frame when the frame being utilized to produce the reference frame has less than a threshold number of errors.

Figure 5:
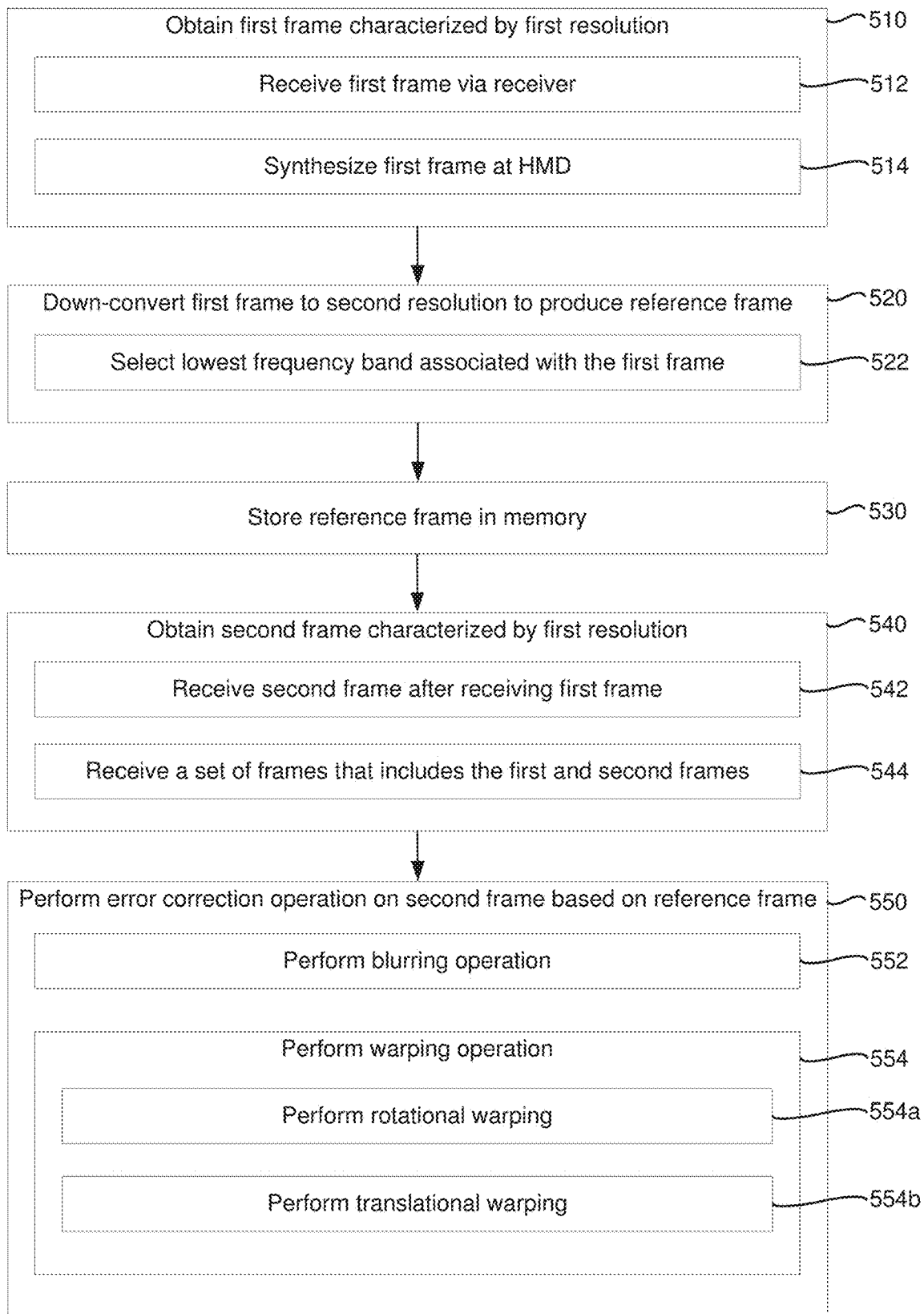
FIG. 5 is a flowchart representation of a method of performing an error correction operation at the HMD in accordance with some implementations.

FIG. 5 is a flowchart representation of a method 500 of performing an error correction operation in accordance with some implementations. In various implementations, the method 500 is performed by an HMD with a display, a non-transitory memory, and one or more processors (e.g., the HMD 300 shown in FIGS. 1, 3 and 4). In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, in some implementations, the method 500 includes obtaining a first frame characterized by a first resolution, down-converting the first frame to a second resolution to produce a reference frame, storing the reference frame in the memory, obtaining a second frame characterized by the first resolution, and performing an error correction operation on the second frame based on the reference frame.

As represented by block 510, in various implementations, the method 500 includes obtaining a first frame that is characterized by a first resolution associated with a first memory allocation. For example, as shown in FIG. 4A, the HMD 300 obtains the first frame 360a characterized by the first resolution 364a. As represented by block 512, in some implementations, the method 500 includes receiving the first frame via a receiver of the HMD (e.g., via the communication interface(s) 308 and/or the I/O devices and sensors 306 shown in FIG. 3). For example, in some implementations, the method 500 includes receiving the first frame from the controller 200 over the communication channel 150 shown in FIG. 1. As represented by block 514, in some implementations, the method 500 includes synthesizing the first frame at the HMD. For example, in some implementations, the method 500 includes capturing the first frame via the one or more image sensors 314 shown in FIG. 3. In some implementations, the method 500 includes obtaining different frequency bands associated with the first frame.

As represented by block 520, in various implementations, the method 500 includes down-converting the first frame to a second resolution that is lower than the first resolution initially defining the first frame in order to produce a reference frame. For example, as shown in FIG. 4A, the down-converting unit 346 down-converts the first frame 360*a* to the second resolution 364*b* that is lower than the first resolution 364*a* in order to produce the reference frame 362*a*. In some implementations, the first resolution is associated with a first memory allocation and the second resolution is associated with a second memory allocation. In some implementations, the second memory allocation is less than a target memory allocation. In some implementations, the target memory allocation is derived from the first memory allocation. In some implementations, the target memory allocation is a function of the first memory allocation. For example, in some implementations, the target memory allocation is less than the first memory allocation. In some implementations, the target memory allocation is a fraction of the first memory allocation.

In some implementations, the first frame is associated with different frequency bands. As represented by block 522, in some implementations, the method 500 includes down-converting the first frame by selecting a portion of the frequency bands associated with the first frame, and discarding the remaining frequency bands associated with the first frame. For example, in some implementations, the method 500 includes selecting the lowest frequency band associated with the first frame. In some implementations, the method 500 includes passing the first frame through a wavelet filter in order to filter out the higher frequency bands associated with the first frame. In some implementations, the method 500 includes passing the first frame through a low pass filter in order to filter out the higher frequency bands associated with the first frame.

As represented by block 530, in various implementations, the method 500 includes storing the reference frame in the memory. For example, as shown in FIG. 4A, the down-converting unit 346 stores the reference frame 362*a* in the memory 320. In some implementations, the method 500 includes storing the lowest frequency band associated with the first frame in the memory. In various implementations, storing the reference frame in the memory (e.g., instead of the first frame) enhances the operability of the HMD, for example, by conserving memory thereby reducing power consumption and/or heat generation.

As represented by block 540, in various implementations, the method 500 includes obtaining a second frame that is characterized by the first resolution. For example, as shown in FIG. 4B, the data obtaining unit 342 obtains the second frame 360*b*. In some implementations, the method 500 includes obtaining the second frame by receiving the second frame via a receiver (e.g., via the communication interface(s) 308 and/or the I/O devices and sensors 306 shown in FIG. 3). In some implementations, the method 500 includes obtaining the second frame by capturing the second frame via an image sensor (e.g., the image sensor(s) 314 shown in FIG. 3). As represented by block 542, in some implementations, the method 500 includes receiving the second frame after receiving the first frame. As represented by block 544, in some implementations, the method 500 includes receiving a set of frames that includes the first frame and the second frame. In other words, in some implementations, the method 500 includes obtaining the first frame and the second frame concurrently.

As represented by block 550, in various implementations, the method 500 includes performing an error correction operation on the second frame based on the reference frame stored in the memory. For example, as shown in FIG. 4B, the error correction unit 350 performs an error correction operation on the second frame 360*b* based on the reference frame 362*a*. As represented by block 552, in some implementations, the method 500 includes performing a blurring operation on the second frame. In some implementations, the method 500 includes blurring a portion of the second frame based on the reference frame stored in the memory at the second resolution. In some implementations, the method 500 includes determining that data corresponding to a portion of the second frame is missing, and generating/synthesizing the missing portion of the second frame based on a corresponding portion of the reference frame.

As represented by block 554, in some implementations, the method 500 includes performing a warping operation on the second frame based on the reference frame. As represented by block 554*a*, in some implementations, the method 500 includes performing a rotational warping operation on the second frame based on the reference frame. In some implementations, the method 500 includes performing the rotational warping operation on the second frame in response to determining that the HMD does not have access to depth data associated with the scene. In some implementations, the method 500 includes alternating presentation of frames between two displays of the HMD in response to determining that the error(s) persist after the rotational warping operation (e.g., temporally shifting a first video stream being displayed on a first display relative to a second video stream being displayed on a second display so that a majority of refresh times of the first and second displays are different). As represented by block 554*b*, in some implementations, the method 500 includes performing a translational warping operation on the second frame based on the reference frame. In some implementations, the method 500 includes performing the translational warping operation in response to determining that the HMD has access to the depth data associated with the scene. In some implementations, the method 500 includes performing the warping operation (e.g., the translational warping operation) based on depth data indicated by the second frame. In some implementations, the method 500 includes performing the warping operation (e.g., the translational warping operation) based on depth data indicated by the reference frame. In some implementations, the method 500 includes performing a positional warping operation (e.g., a combination of a rotation warping operation and a translational warping operation) on the second frame based on the reference frame. In various implementations, performing the error correction operation on the second frame based on the reference frame (e.g., instead of the first frame) enhances the operability of the HMD, for example, by conserving memory thereby reducing power consumption and/or heat generation.

In various implementations, the method 500 includes determining whether or not there is an error in the second frame. In some implementations, the method 500 includes determining whether the error(s) associated with the second frame exceeds an error threshold (e.g., a threshold number of errors and/or a threshold degree of errors). In some implementations, the method 500 includes determining whether one or more blocks of scanlines of the second frame are missing/damaged/corrupted.

Figure 6A:
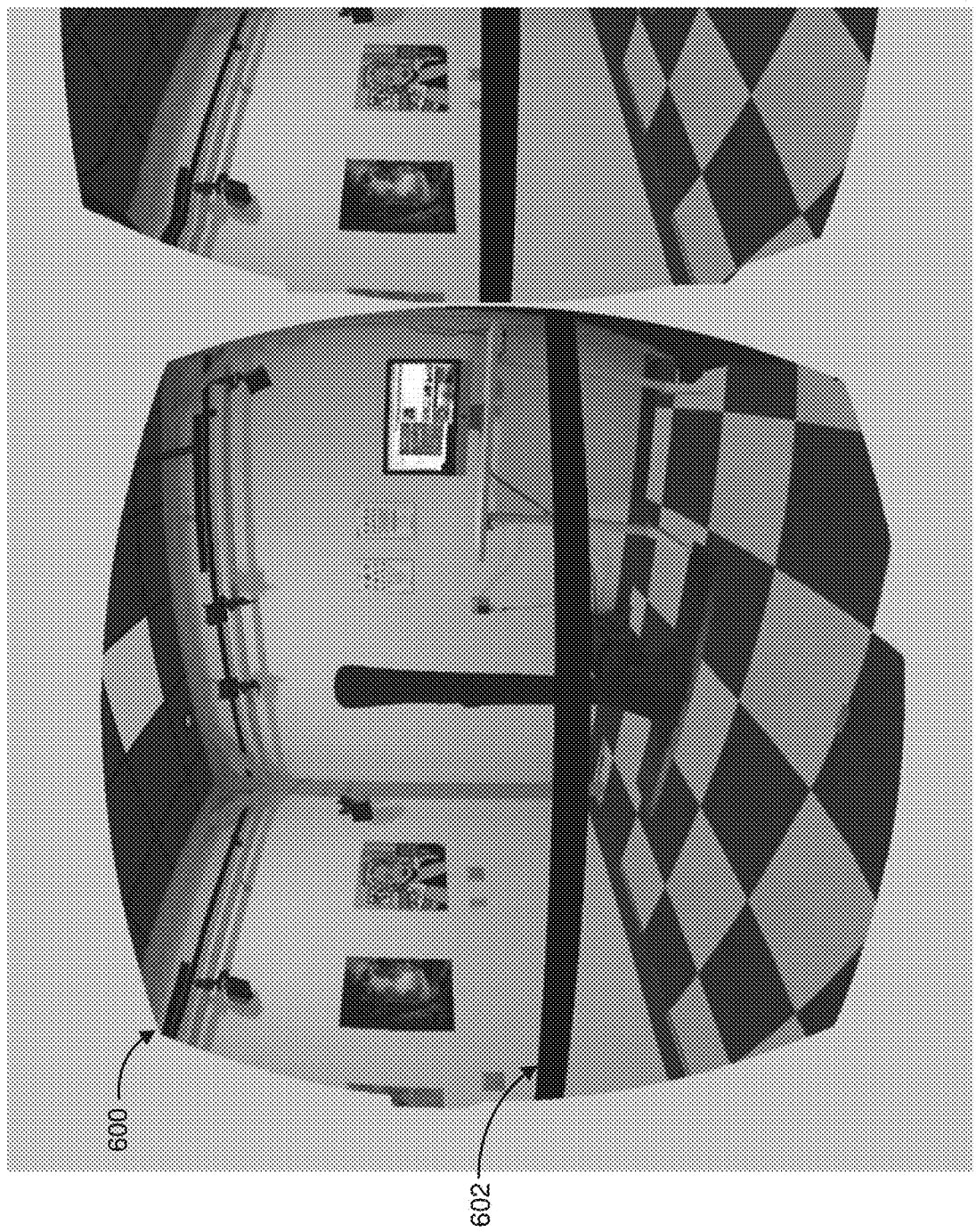
FIG. 6A is a diagram that illustrates an example frame with lost information in accordance with some implementations.

FIG. 6A is a diagram that illustrates an example frame 600 that includes a scanline 602 indicating lost/damaged/corrupted information. In the example of FIG. 6A, the scanline 602 is horizontal and black in color. In some implementations, the scanline 602 is vertical. In some implementations, the scanline 602 has a color other than black (e.g., white). In some implementations, a presence of the scanline 602 indicates that the frame 600 includes an error. For example, the scanline 602 indicates that the data corresponding to the scanline 602 is missing/damaged/corrupted.

Figure 6B:
FIG. 6B is a diagram that illustrates a rotational warping operation on the frame shown in FIG. 6A to compensate for the lost information in accordance with some implementations.

FIG. 6B is a diagram that illustrates a rotational warping operation on the frame 600 shown in FIG. 6A to compensate for the lost information in accordance with some implementations. In the example of FIG. 6B, the HMD 300 (e.g., the error correction unit 350) performed a rotational warping operation on the frame 600 in order to compensate for the missing/damaged/corrupted data corresponding to the scanline 602 shown in FIG. 6A. As illustrated in FIG. 6B, performing the rotational warping operation on the frame 600 removes the scanline 602 shown in FIG. 6A. As described herein, in various implementations, the HMD 300 performs the rotational warping operation on the frame 600 based on a reference frame that has a lower resolution than the frame 600 and is stored in the memory 320.

Figure 7A:
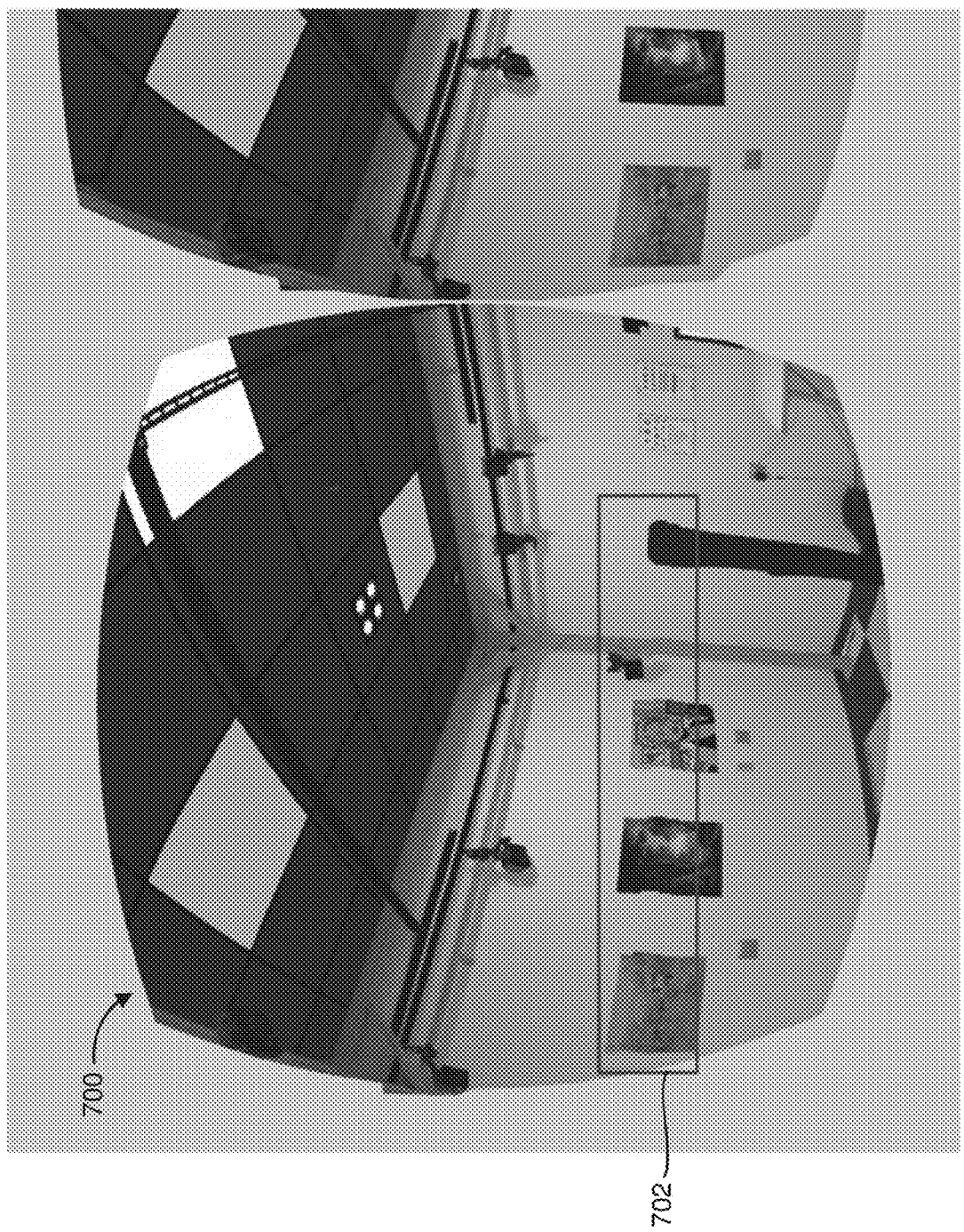
FIG. 7A is a diagram that illustrates an example frame that corresponds with a scene with missing information in accordance with some implementations.

FIG. 7A is a diagram that illustrates an example frame 700 that corresponds to a static scene with missing information. In some implementations, a static scene refers to a scene that includes non-movable objects (e.g., objects that are not moving) and no moving objects. In the example of FIG. 7A, the missing information results in deformed objects 702. As illustrated in FIG. 7A, in some implementations, the deformed objects 702 have misshaped edges. For example, instead of straight lines, the edges of the deformed objects 702 consist of broken and/or jagged lines. More generally, in various implementations, the deformed objects 702 are misshaped due to the missing information.

Figure 7B:
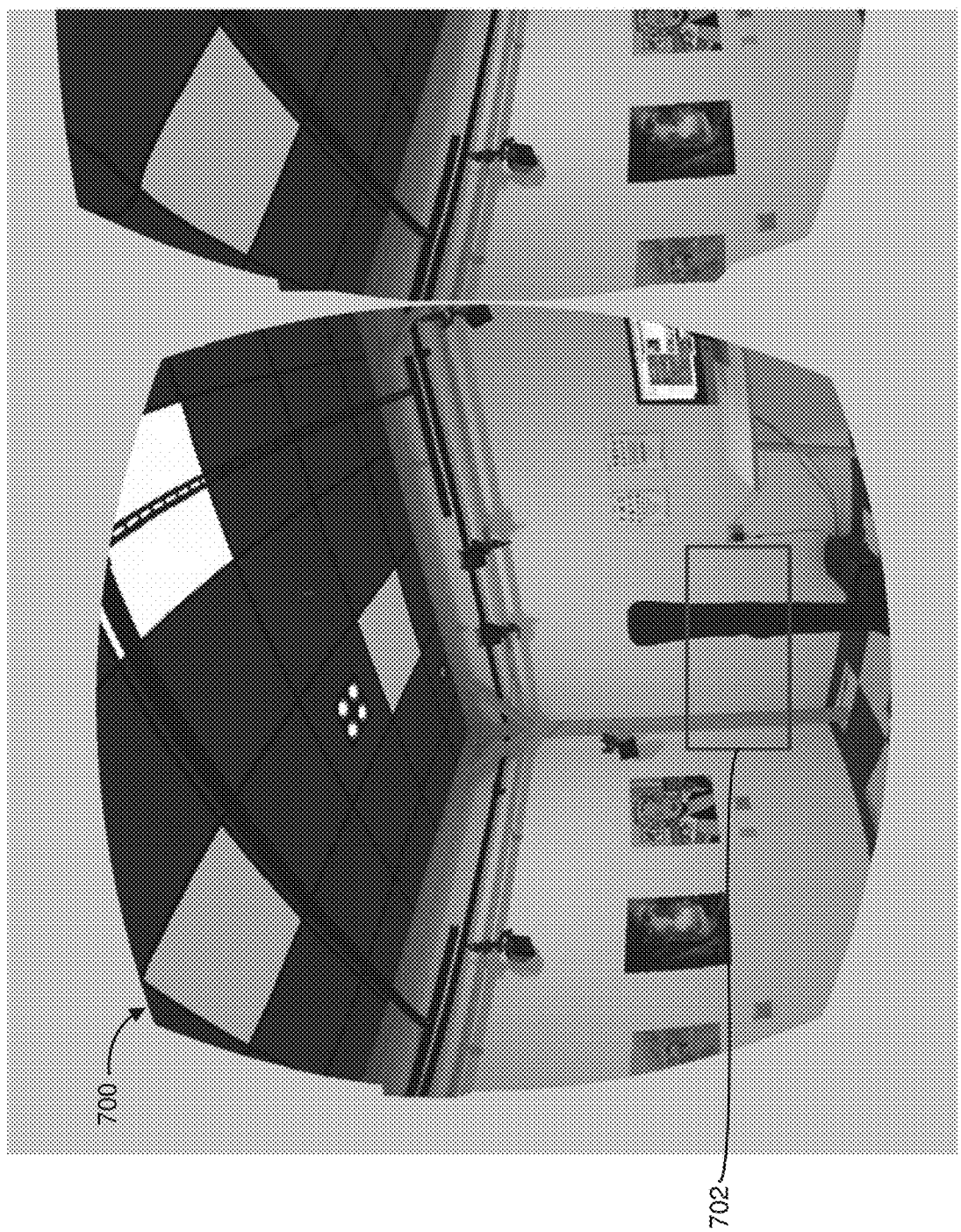
FIG. 7B is a diagram that illustrates a translational warping operation on the frame shown in FIG. 7A to compensate for the missing information in accordance with some implementations.

FIG. 7B is a diagram that illustrates a positional warping operation on the frame 700 shown in FIG. 7A to compensate for the missing information in accordance with some implementations. In the example of FIG. 7B, the HMD 300 (e.g., the error correction unit 350) performed a positional warping operation on the frame 700 in order to compensate for the missing/damaged/corrupted data that resulted in the deformed objects 702 shown in FIG. 7A. As illustrated in FIG. 7B, performing the positional warping operation on the frame 700 remedies at least some of the deformed objects 702 shown in FIG. 7A. As illustrated in FIG. 7B, the number of deformed objects 702 has reduced. As described herein, in various implementations, the HMD 300 performs the positional warping operation on the frame 700 based on a reference frame that has a lower resolution than the frame 700 and is stored in the memory 320. As described herein, in some implementations, the HMD 300 performs the positional warping operation on the frame 700 based on depth data associated with the static scene. In some implementations, the HMD 300 obtains the depth data from the frame 700. In some implementations, the HMD 300 obtains the depth data from the reference frame.

Figure 8A:
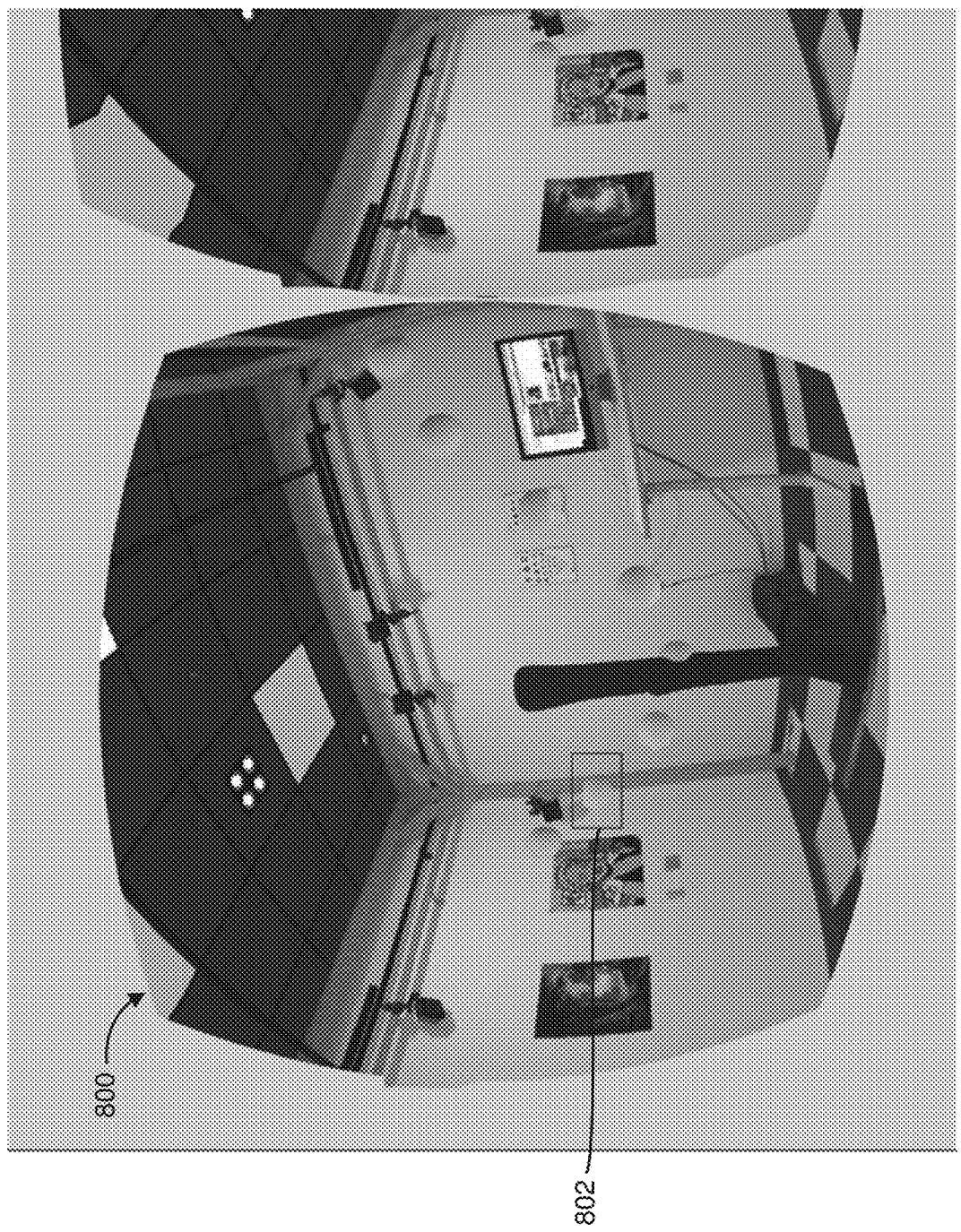
FIG. 8A is a diagram that illustrates an example frame that corresponds to a dynamic scene with artifacts in accordance with some implementations.
Figure 8B:
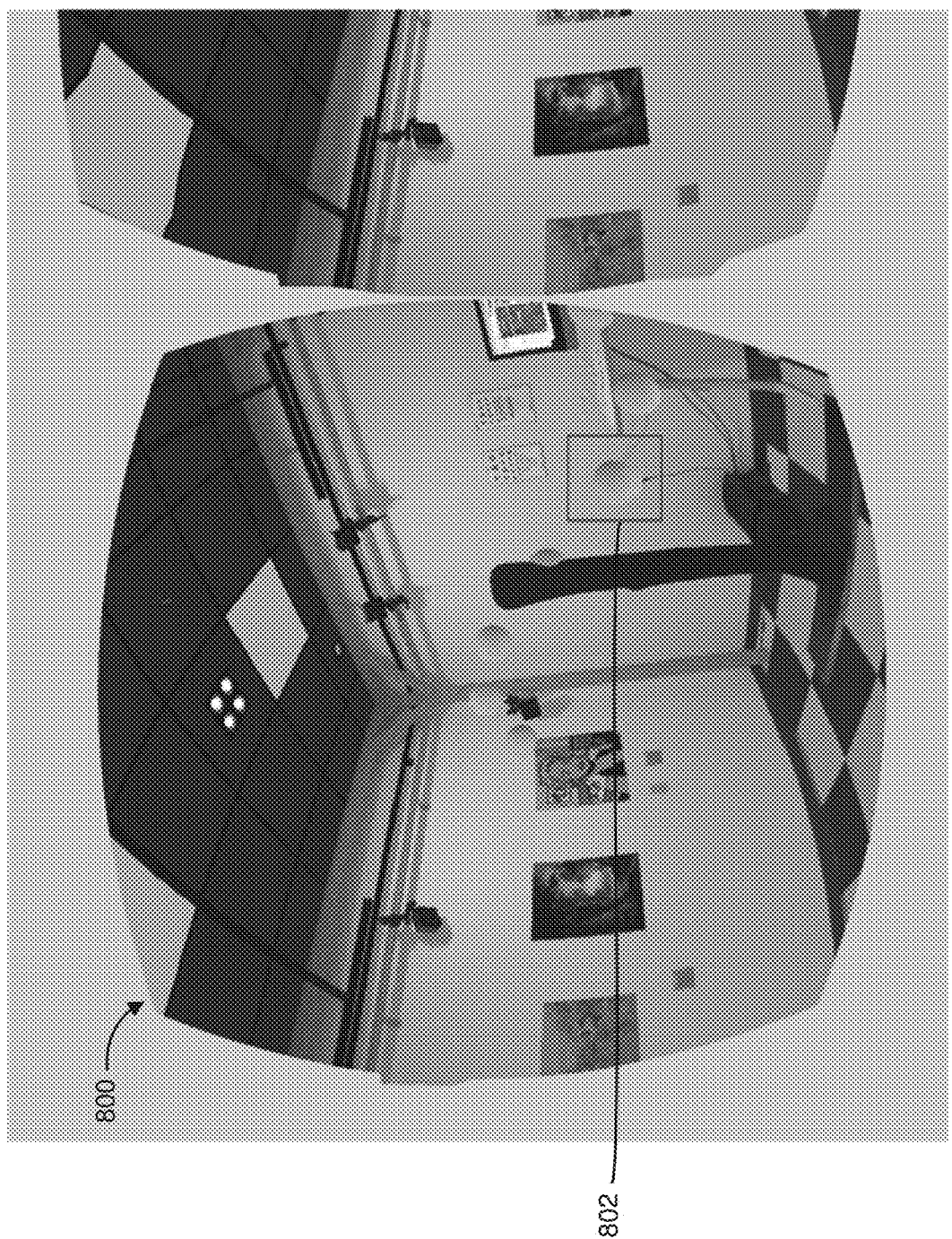
FIG. 8B is a diagram that illustrates a rotational warping operation on the frame shown in FIG. 8A to remove the artifacts in accordance with some implementations.

FIG. 8A is a diagram that illustrates an example frame 800 that corresponds to a dynamic scene with artifacts. In some implementations, a dynamic scene refers to a scene with moving objects. In some implementations, an artifact refers to a deformed object. In some implementations, an artifact refers to an erroneous object (e.g., an object that is not present at the scene but the HMD 300 nevertheless presents a visual representation of the object). In the example of FIG. 8A, an object 802 is deformed. For example, a portion of the object 802 is missing. Referring to FIG. 8B, the HMD 300 performs a rotational warping operation on the frame 800 to compensate for the deformity in the object 802 shown in FIG. 8A. As illustrated in FIG. 8B, performing the rotational warping operation on the frame 800 restores the shape of the object 802 to a sphere. More generally, in various implementations, performing a rotational warping operation on a frame that corresponds to a dynamic scene removes at least some of the artifacts from the frame.

Figure 9A:
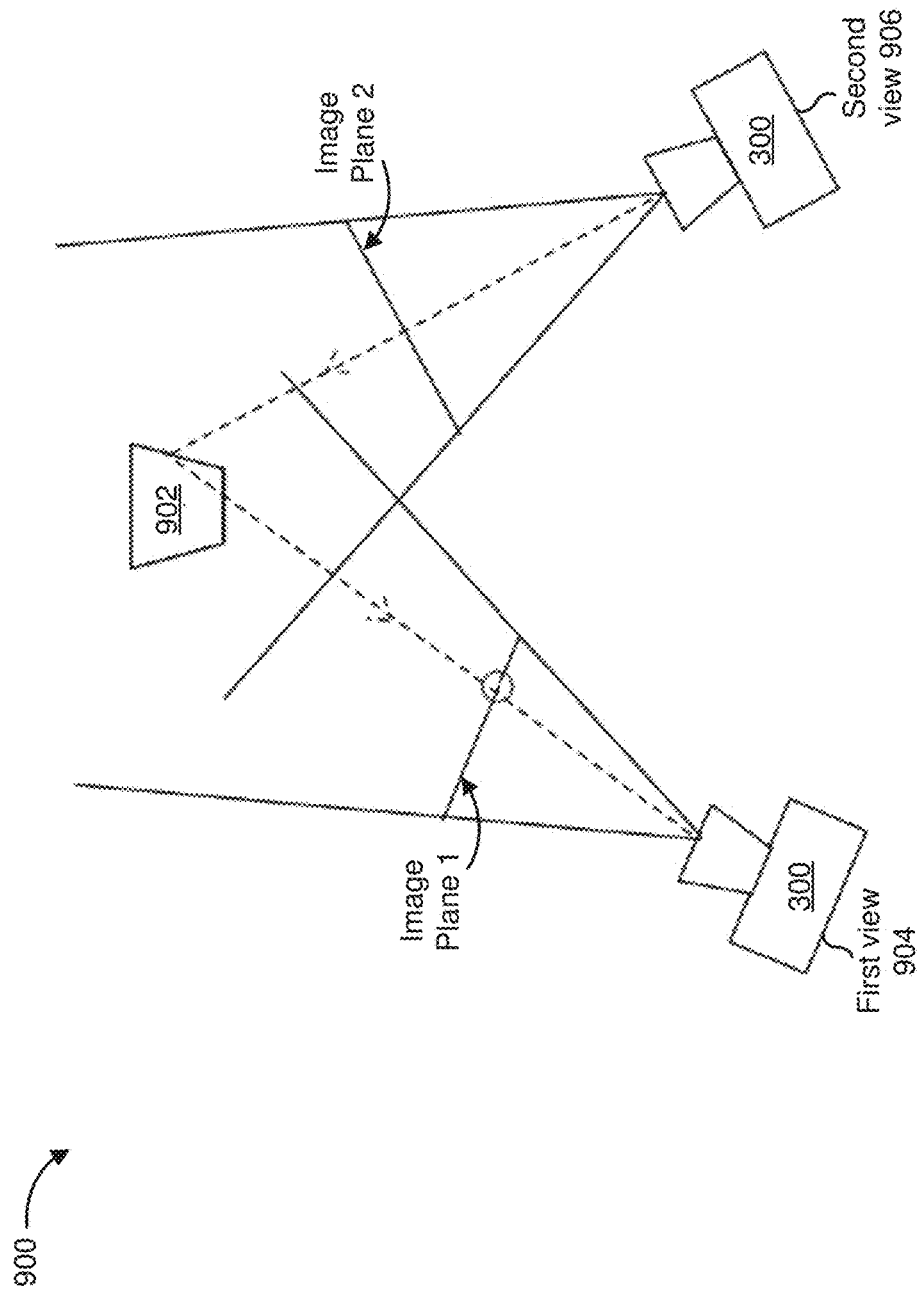
FIG. 9A is a schematic diagram of an environment in which the HMD performs a warping operation based on depth data associated with an updated view in accordance with some implementations.

FIG. 9A is a schematic diagram of an environment 900 in which the HMD 300 performs a warping operation. As illustrated in FIG. 9A, the environment 900 includes an object 902 that is in a field of view of the HMD 300. In the example of FIG. 9A, the HMD 300 is at a first position that enables the HMD 300 to capture a frame that corresponds to a first view 904 (e.g., a reference view). In some implementations, the HMD 300 detects an error in the frame that corresponds to the first view 904. As such, the HMD 300 performs a warping operation on the frame based on a frame that corresponds to a second view 906 (e.g., an updated view or a new view). In other words, in the example of FIG. 9A, the first view 904 represents an old view and the second view 906 represents a new view to which the frame corresponding to the first view 904 is warped.

In some implementations, the HMD 300 utilizes a pixel shader that un-projects each texture coordinate into the scene using a camera projection, a view matrix and scene depth. In some implementations, after un-projecting the texture coordinate, the HMD 300 re-projects the texture coordinate into the old space. In some implementations, the HMD 300 utilizes backward mapping to perform the warping operation. For example, the HMD 300 transitions from an image space of the second view 906 to an image space of the first view 904. In some implementations, the HMD 300 utilizes scene depth associated with the second view 906 (e.g., the updated view) to project texture coordinates into the scene. In some implementations, the HMD 300 projects the texture coordinates back into the image space of the first view 904 to obtain color that the texture coordinates are to acquire. In some implementations, performing the warping operation in the environment 900 leads to doubling at pixels that are not seen by the first view 904. In such implementations, the new pixels acquire colors of corresponding pixels from the first view 904.

Figure 9B:
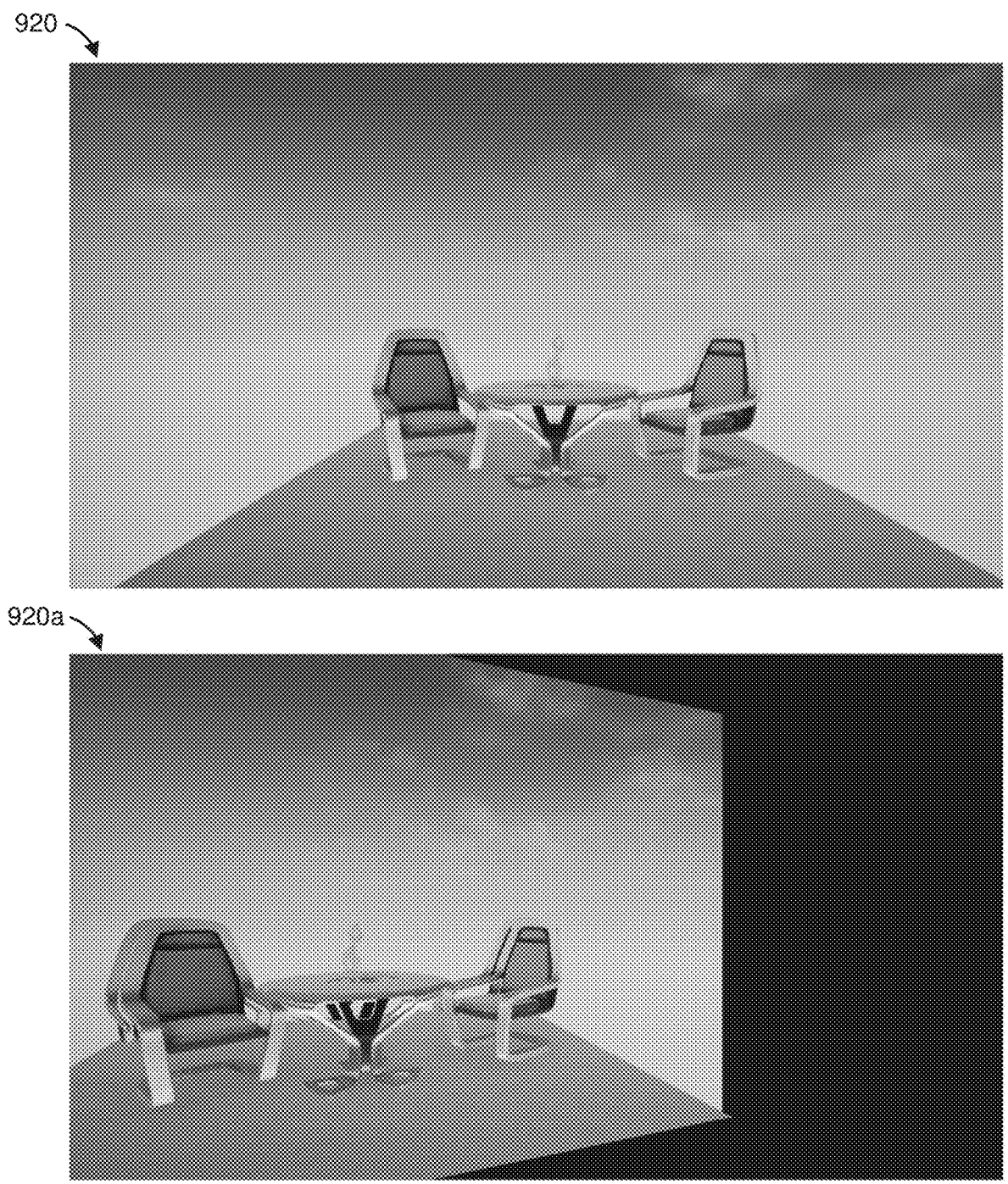
FIG. 9B is a diagram that illustrates a rightward warping operation based on the depth data associated with an updated view in accordance with some implementations.

FIG. 9B is a diagram that illustrates a reference image 920 and a rightward warped version 920a of the reference image 920. In some implementations, the HMD 300 generates the rightward warped version 920a of the reference image 920 based on depth data associated with an updated view instead of utilizing depth data associated with the reference image 920 (e.g., as illustrated in the environment 900 shown in FIG. 9A).

Figure 9C:
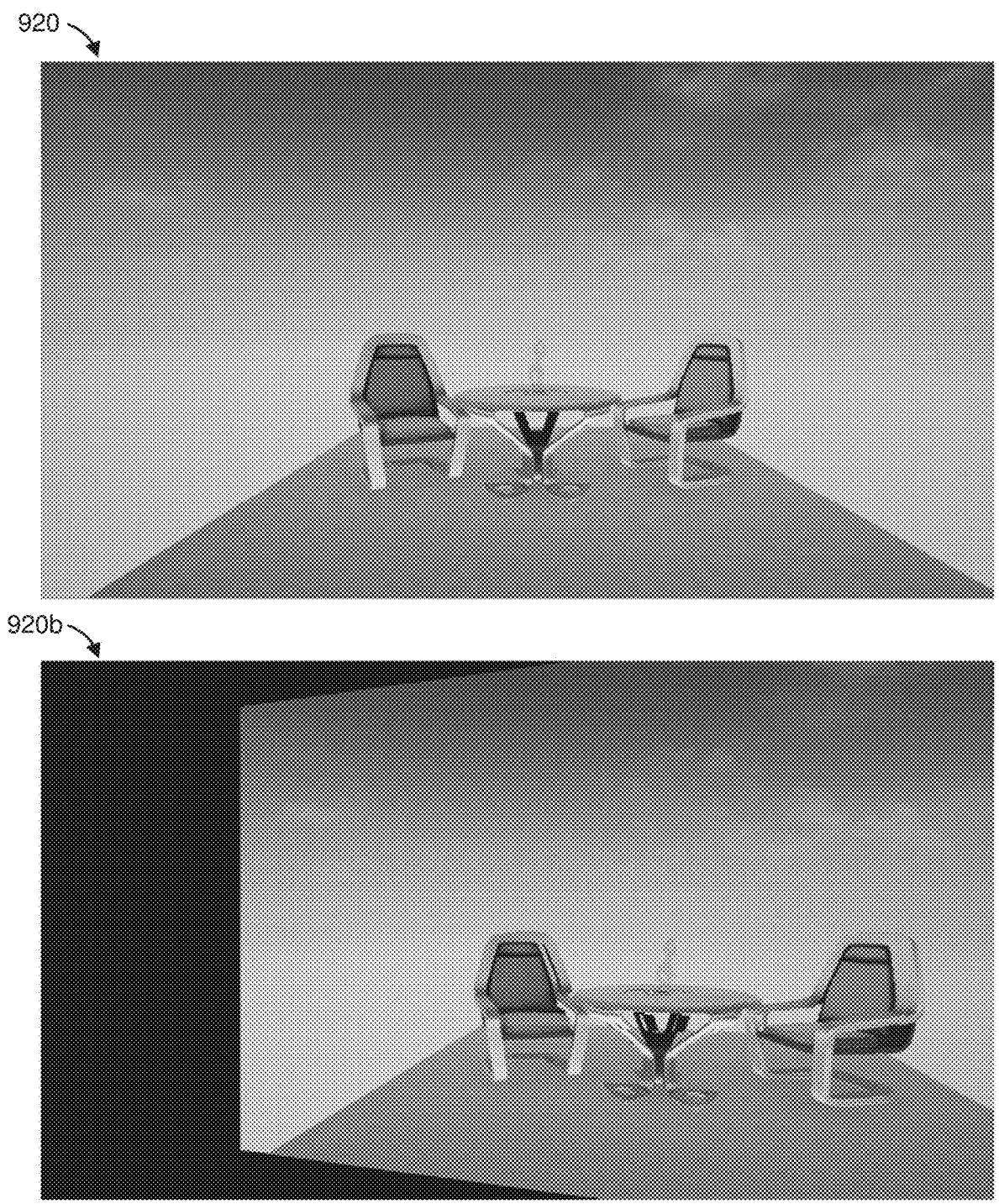
FIG. 9C is a diagram that illustrates a leftward warping operation based on the depth data associated with an updated view in accordance with some implementations.

FIG. 9C is a diagram that illustrates the reference image 920 and a leftward warped version 920b of the reference image 920. In some implementations, the HMD 300 generates the leftward warped version 920b of the reference image 920 based on depth data associated with an updated view instead of utilizing depth data associated with the reference image 920 (e.g., as illustrated in the environment 900 shown in FIG. 9A).

Figure 10A:
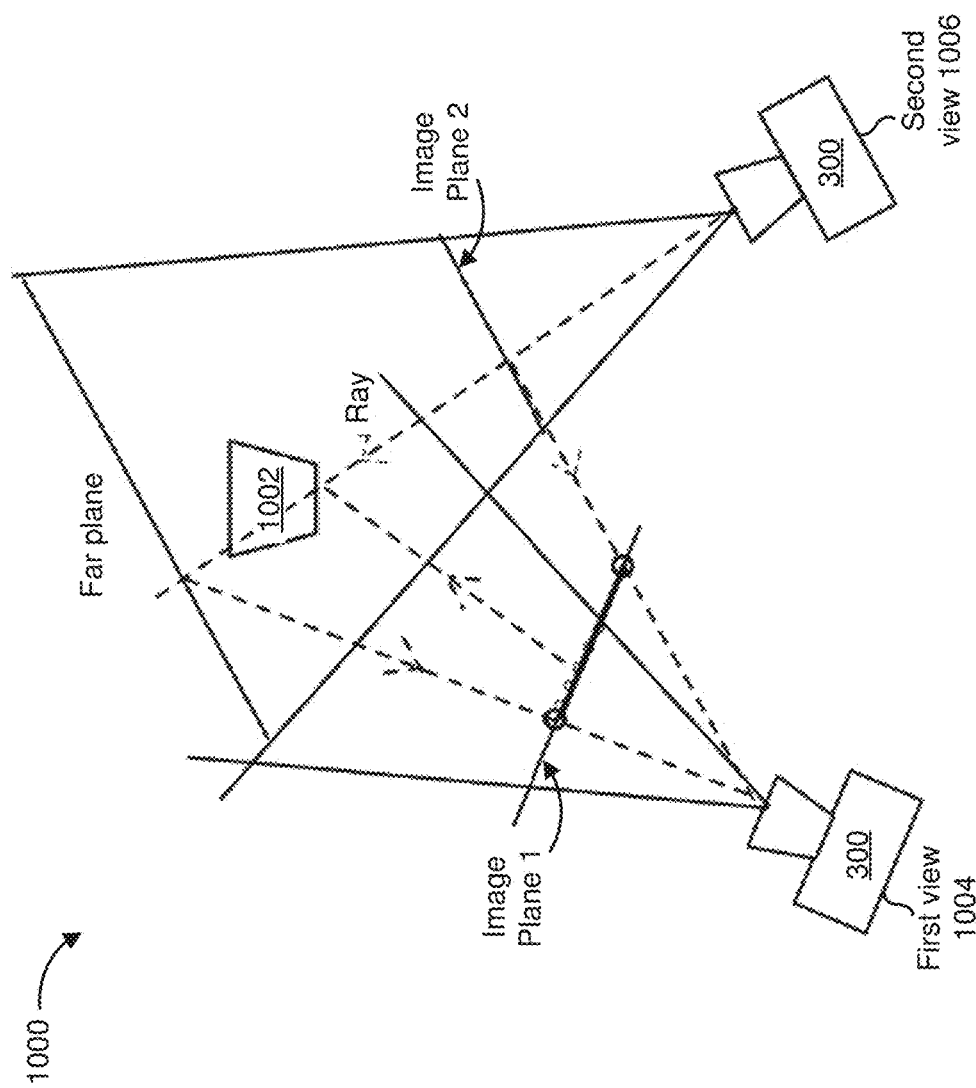
FIG. 10A is a schematic diagram of an environment in which the HMD performs a warping operation based on depth data associated with a reference view in accordance with some implementations.

FIG. 10A is a schematic diagram of an environment 1000 in which the HMD 300 performs a warping operation. As illustrated in FIG. 10A, the environment 1000 includes an object 1002 that is in a field of view of the HMD 300. In the example of FIG. 10A, the HMD 300 is at a first position that enables the HMD 300 to capture a frame that corresponds to a first view 1004 (e.g., a reference view). In some implementations, the HMD 300 detects an error in the frame that corresponds to the first view 1004. As such, the HMD 300 performs a warping operation on the frame based on a frame that corresponds to a second view 1006 (e.g., an updated view or a new view). In other words, in the example of FIG. 10A, the first view 1004 represents an old view and the second view 1006 represents a new view to which the frame corresponding to the first view 1004 is warped.

Figure 10B:
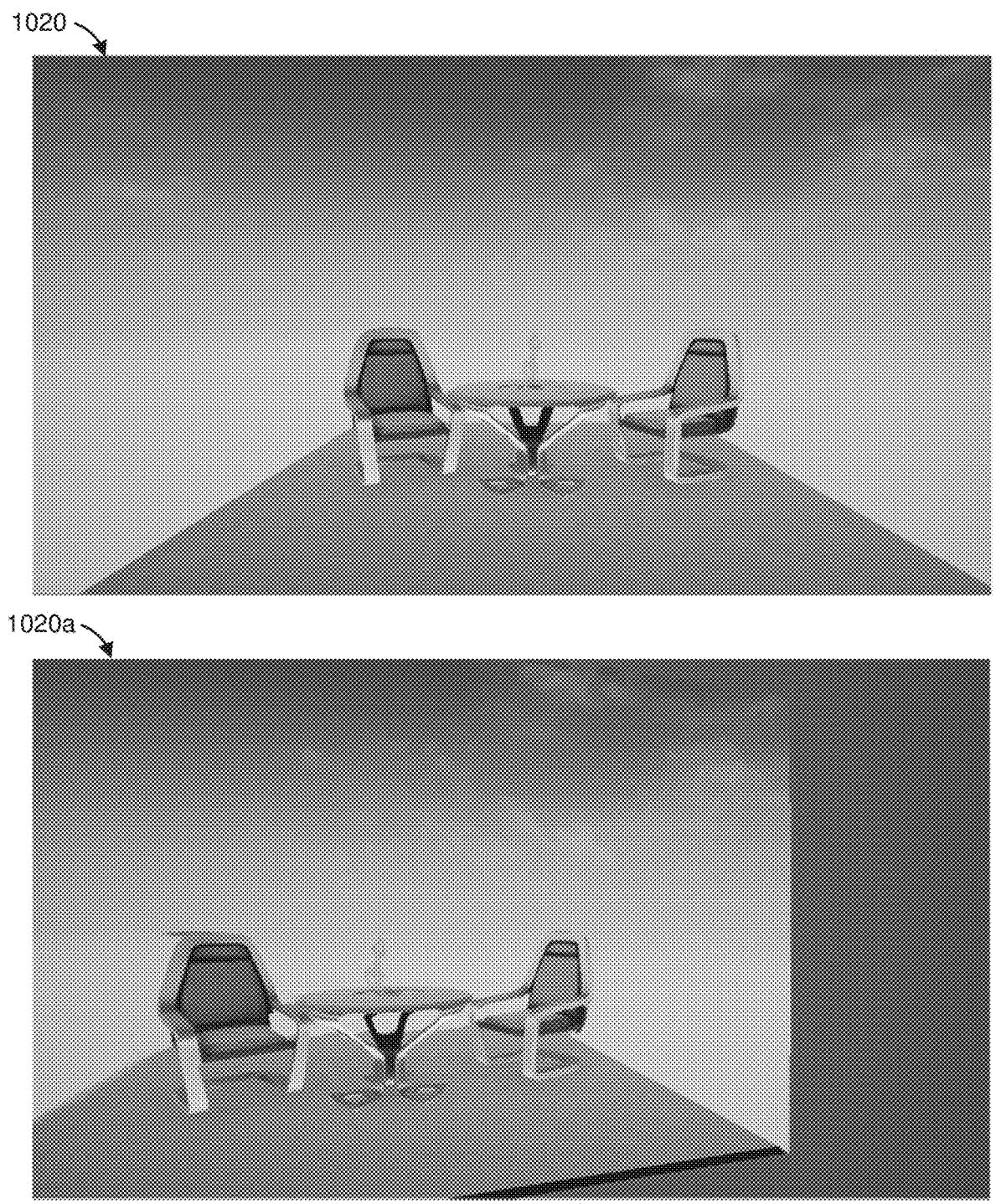
FIG. 10B is a diagram that illustrates a rightward warping operation based on the depth data associated with a reference view in accordance with some implementations.
Figure 10C:
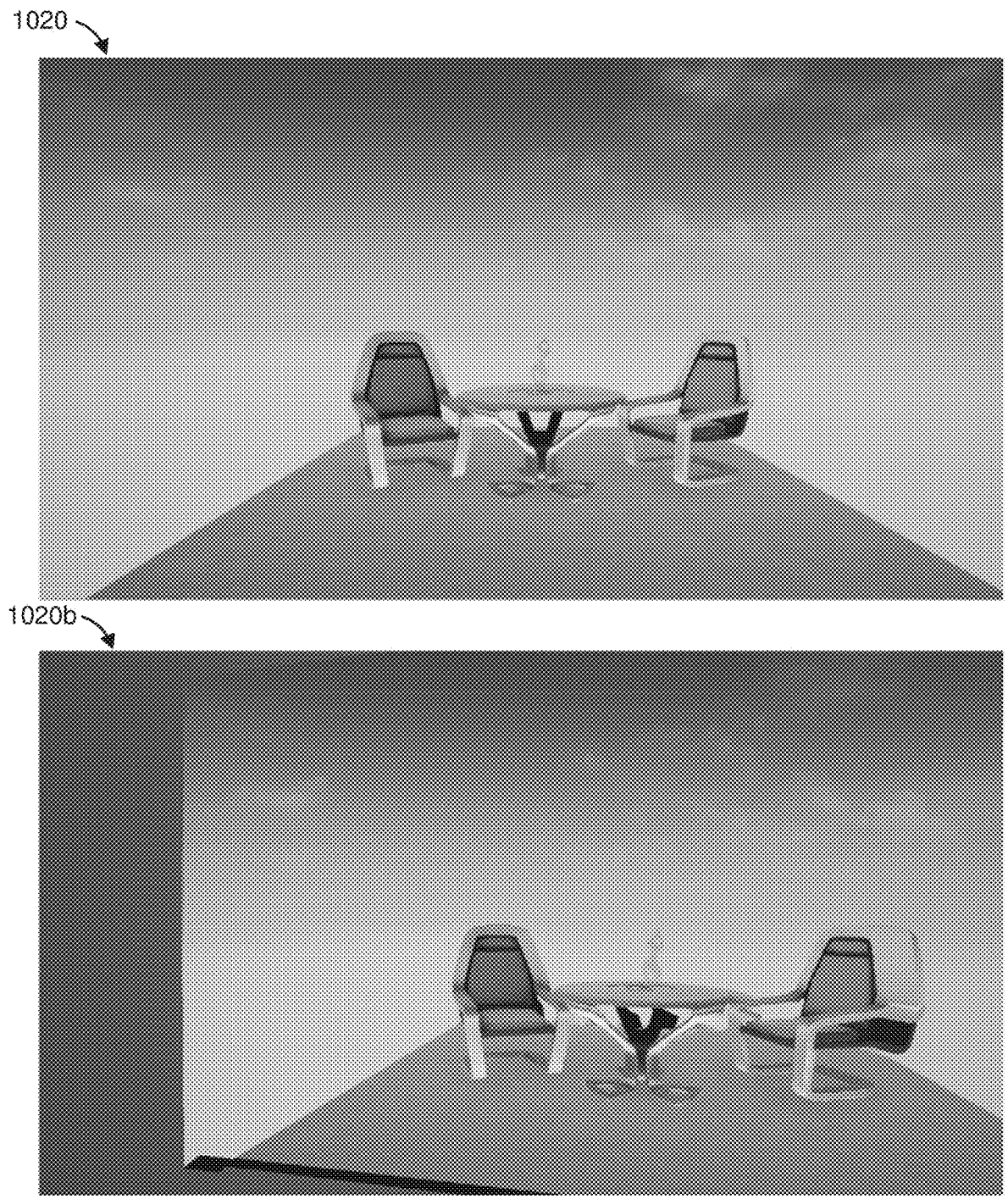
FIG. 10C is a diagram that illustrates a leftward warping operation based on the depth data associated with a reference view in accordance with some implementations.

In some implementations, the HMD 300 un-projects each texture coordinate (u2, v2) into a ray in the scene (e.g., the world space). In some implementations, a line segment of the ray between a near plane (e.g., the image plane 2) and the far plane is projected into the first view 1004. In some implementations, the projected line segment is sampled (u1, v1), and each sample is un-projected into the scene. In some implementations, after each sample is un-projected into the scene, each sample is re-projected into a texture space of the second view 1006 using depth data associated with the first view 1004. In some implementations, the newly obtained texture coordinate is compared to the old texture coordinated (u2, v2). If the newly obtained texture coordinated is below a predetermined threshold, the text coordinate (u2, v2) obtains the color of the sampled point on the line segment (u1, v1). In some implementations, if there is not a sample that matches, the texture coordinate (u2, v2) appears as a hole. In the examples of FIGS. 10A-10C, the HMD 300 utilizes depth data associated with the reference view (e.g., the first view 1004) instead of utilizing depth data associated with the updated view (e.g., the second view 1006).

FIG. 10B is a diagram that illustrates a reference image 1020 and a rightward warped version 1020a of the reference image 1020. In some implementations, the HMD 300 generates the rightward warped version 1020a of the reference image 1020 based on depth data associated with the reference image 1020.

FIG. 10C is a diagram that illustrates the reference image 1020 and a leftward warped version 1020b of the reference image 1020. In some implementations, the HMD 300 generates the leftward warped version 1020b of the reference image 1020 based on depth data associated with the reference image 1020.

Figure 11:
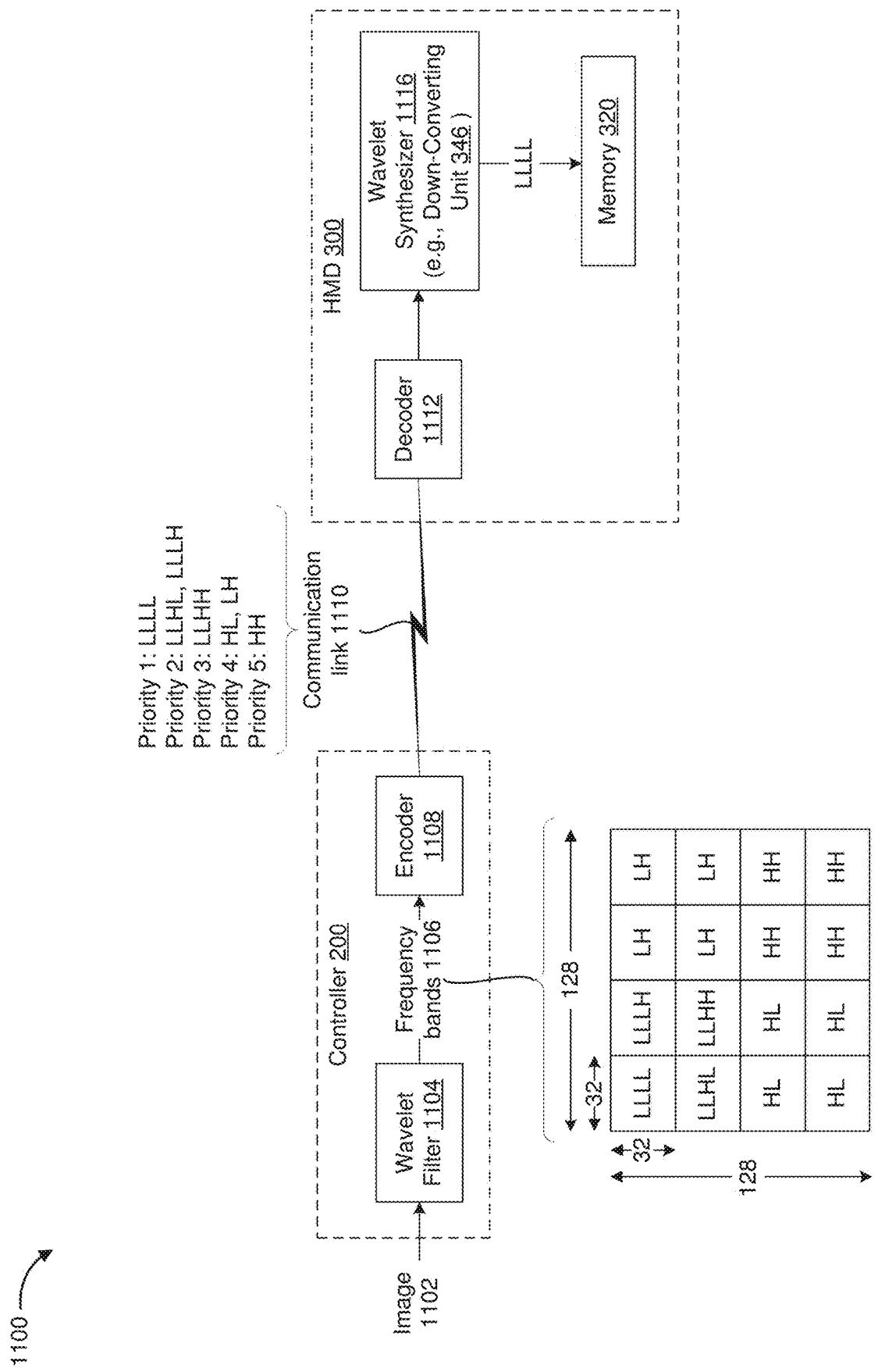
FIG. 11 is a schematic diagram of a system that performs a wavelet transform in accordance with some implementations.

FIG. 11 is a schematic diagram of a system 1100 for down-converting a frame in accordance with some implementations. In various implementations, the system 1100 includes a wavelet filter 1104 (e.g., a 2D wavelet filter), an encoder 1108 (e.g., a High Efficiency Video Coding (HEVC) codec), a decoder 1112 and a wavelet synthesizer 1116 (e.g., wavelet synthesis filter). In some implementations, the wavelet filter 1104 and the encoder 1108 reside at the controller 200. In some implementations, the decoder 1112 and the wavelet synthesizer 1116 reside at the HMD 300.

In various implementations, the wavelet filter 1104 includes a front-end wavelet transform that divides an image 1102 into different frequency bands 1106. In some implementations, the wavelet filter 1104 groups the frequency bands 1106 into disparate blocks that are sent to the encoder 1108. In the example of FIG. 11, the wavelet filter 1104 divides the image 1102 into 128×128 blocks. In the example of FIG. 11, the wavelet filter 1104 applies a two level wavelet decomposition to each 128×128 block to generate sixteen 32×32 blocks that are sent the encoder 1108. In some implementations, the wavelet filter 1104 divides the image 1102 into seven different frequency bands (e.g., LLLL, LLHL, LLLH, LLHH, LH, HL and HH). In the example of FIG. 11, LLLL represents the lowest frequency band. In some implementations, the LLLL frequency band is equivalent to a low-pass filtered version of the image 1102.

In some implementations, the encoder 1108 encodes the frequency bands 1106 separately and transmits the frequency bands 1106 over a communication link 1110 (e.g., the communication channel 150 shown in FIG. 1).

In some implementations, the communication link 1110 gives different transmission priorities to different frequency bands 1106. In the example of FIG. 11, the communication link 1110 gives highest transmission priority to the LLLL frequency band (e.g., the lowest frequency band), and lowest transmission priority to the HH frequency band (e.g., the highest frequency band). In some implementations, the communication link 1110 provides additional error protection to the LLLL frequency band. More generally, in some implementations, the communication link 1110 provides additional error protection to frequency bands that have a higher transmission priority (e.g., in order to reduce the need for error correction/concealment at the HMD 300).

In some implementations, the decoder 1112 decodes packets that the decoder 1112 receives from the controller 200. In some implementations, the decoder 1112 forwards the decoded packets to the wavelet synthesizer 1116.

In some implementations, the wavelet synthesizer 1116 re-constructs the image 1102. In some implementations, the wavelet synthesizer 1116 stores the LLLL frequency band in the memory 320 as a reference frame (e.g., the reference frame 362a shown in FIG. 4A) that the HMD 300 can use to correct/conceal an error in a subsequent image. More generally, in various implementations, the wavelet synthesizer 1116 stores a portion of the frequency bands (e.g., one of the frequency bands, for example, the lowest frequency band) associated with the image 1102 in the memory 320. In some implementations, the lowest frequency band has a memory allocation that is less than the target memory allocation. In some implementations, the higher frequency bands have a memory allocation that is greater than the target memory allocation. As such, storing the lowest frequency band in the memory 320 allows the HMD 300 to satisfy the target memory allocation. In the example of FIG. 11, storing the LLLL frequency band reduces the memory allocation for the image 1102 by a factor of 16. In some implementations, down-converting the image 1102 includes storing a portion of the frequency bands associated with the image 1102 (e.g., storing the lowest frequency band associated with the image 1102, for example, storing the LLLL frequency band). In some implementations, the wavelet synthesizer 1116 resides at the down-converting unit 346 shown in FIGS. 3-4C.

In some implementations, the HMD 300 corrects/conceals errors in a subsequent image by performing a rotational/translational warping operation on the LLLL frequency band stored in the memory 320. In some implementations, the HMD 300 utilizes head pose parameters and/or motion vectors to perform the rotation/translational warping operation on the LLLL frequency band. As described herein, performing a warping operation based on the reference frame (e.g., the LLLL frequency band stored in the memory 320) tends to correct/conceal errors such as tearing artifacts.

Figure 12:
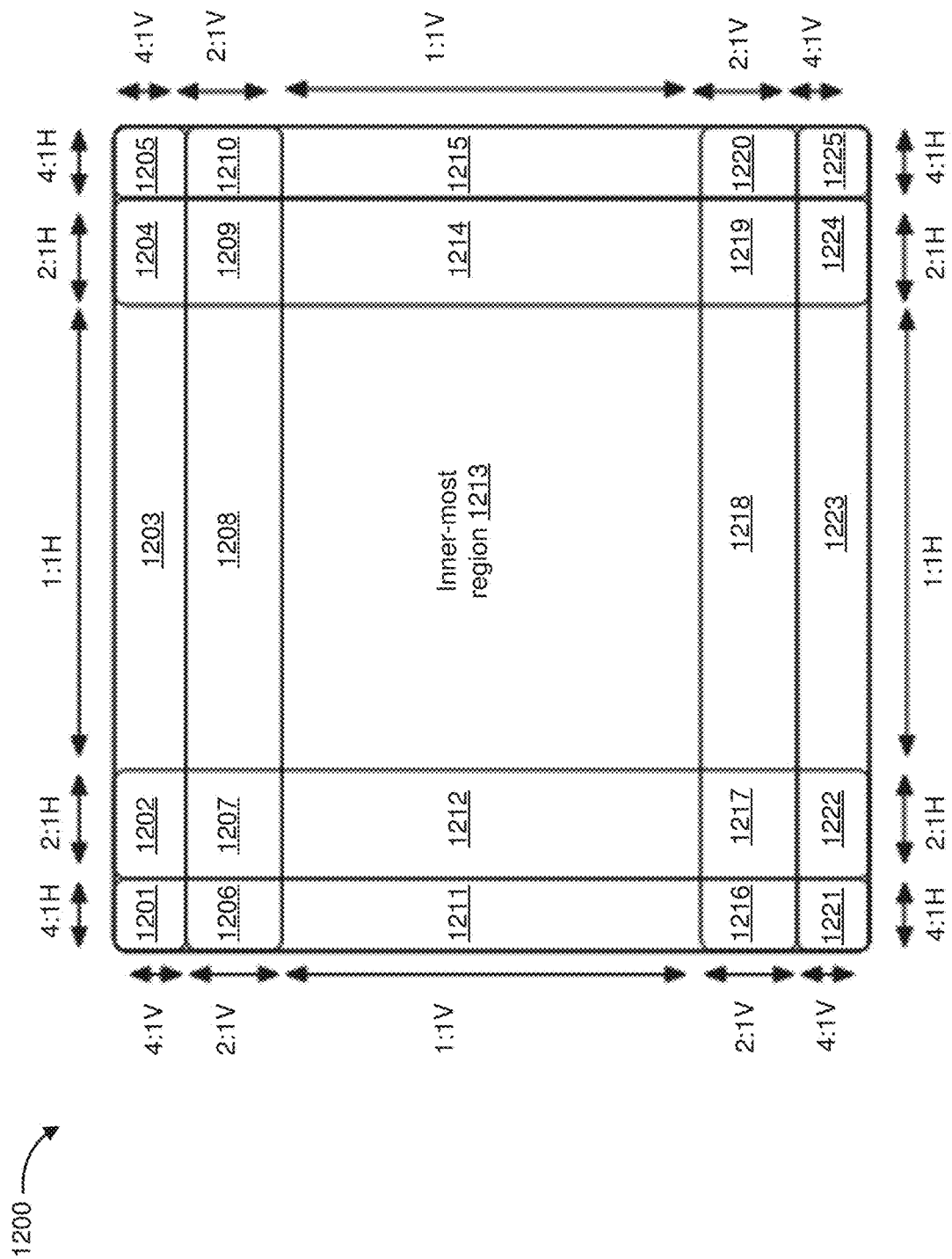
FIG. 12 is a diagram that illustrates foveated imaging in accordance with some implementations.

FIG. 12 is a diagram that illustrates foveated imaging in accordance with some implementations. FIG. 12 illustrates an example foveated image 1200. In some implementations, a foveated image refers to an image in which different portions of the image have different resolutions. In the example of FIG. 12, the image 1200 is divided into 25 different regions 1201, 1202 . . . 1225 with varying resolutions. For example, the image 1200 includes an innermost region 1213 where the image 1200 is not down-sampled. In the example of FIG. 12, the corner regions 1201, 1205, 1221 and 1225 are down-sampled by a factor of 4 in the vertical and horizontal dimensions. In some implementations, the image 1200 corresponds to an image captured by an eye tracking camera. As such, in some implementations, the innermost region 1213 corresponds to the gaze of the eye whereas the corner regions 1201, 1205, 1221 and 1225 correspond to the periphery of the eye. In some implementations, the frames obtained by the HMD 300 correspond to foveated images such as the image 1200.

Figure 13:
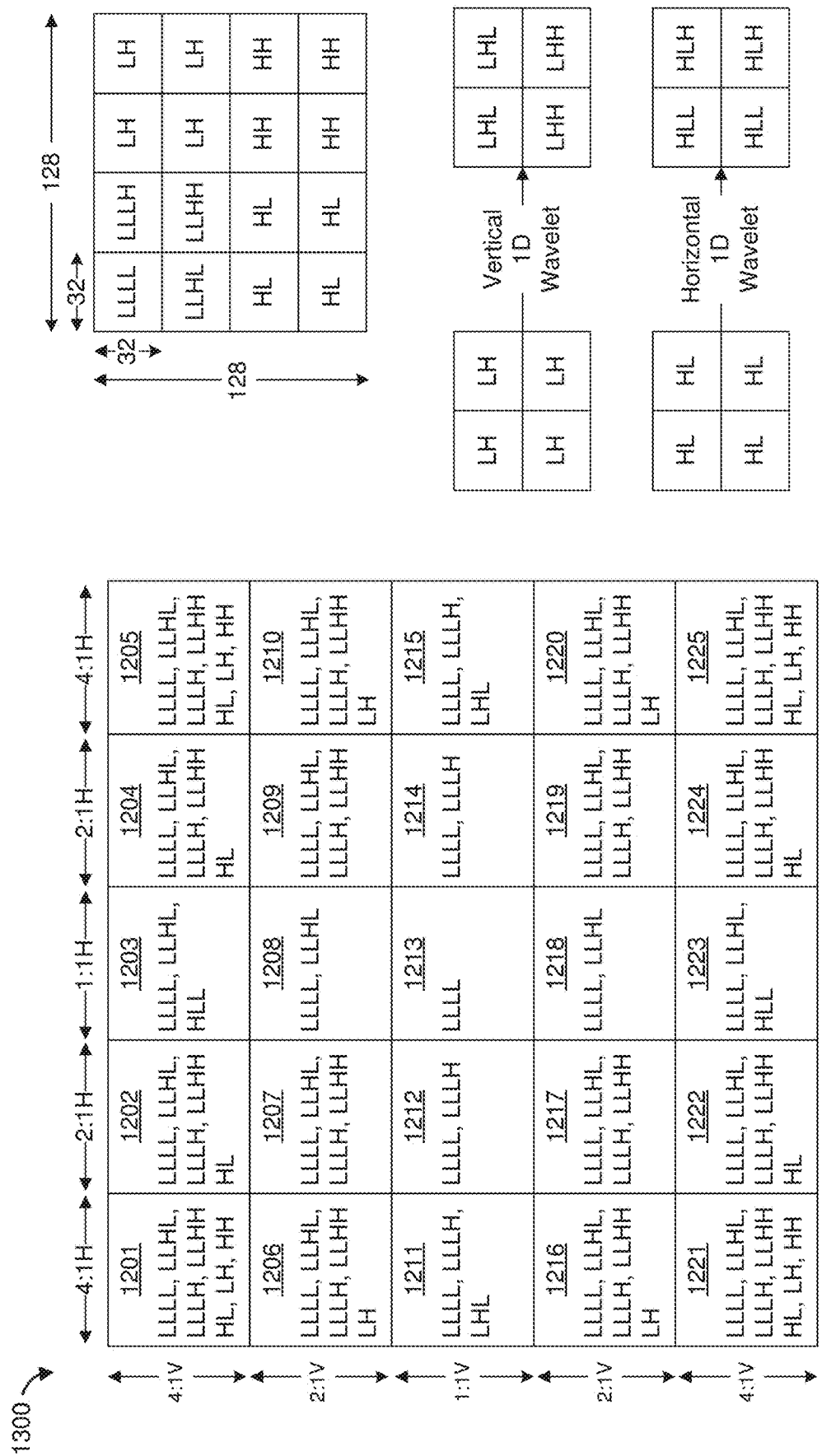
FIG. 13 is a diagram that illustrates down-converting a frame that corresponds to a foveated image in accordance with some implementations.

FIG. 13 illustrates an example reference frame 1300 that the HMD 300 produces by down-converting the image 1200 shown in FIG. 12. In some implementations, the HMD 300 down-converts the image 1200 by storing different frequency bands for different regions of the image 1200. For example, in some implementations, the HMD 300 stores the lowest frequency band for the innermost region 1213, and all the frequency bands for the corner regions 1201, 1205, 1221 and 1225. In some implementations, by storing different frequency bands for different regions of the image 1200, the HMD 300 maintains a constant resolution throughout the reference frame 1300. In the example of FIG. 13, the reference frame 1300 has an effective resolution that is a fourth of the resolution of the innermost region 1213 of the image 1200. Storing fewer frequency bands for higher resolution regions allows the reference frame 1300 to have a memory allocation that is less than the target memory allocation.

Figure 14:
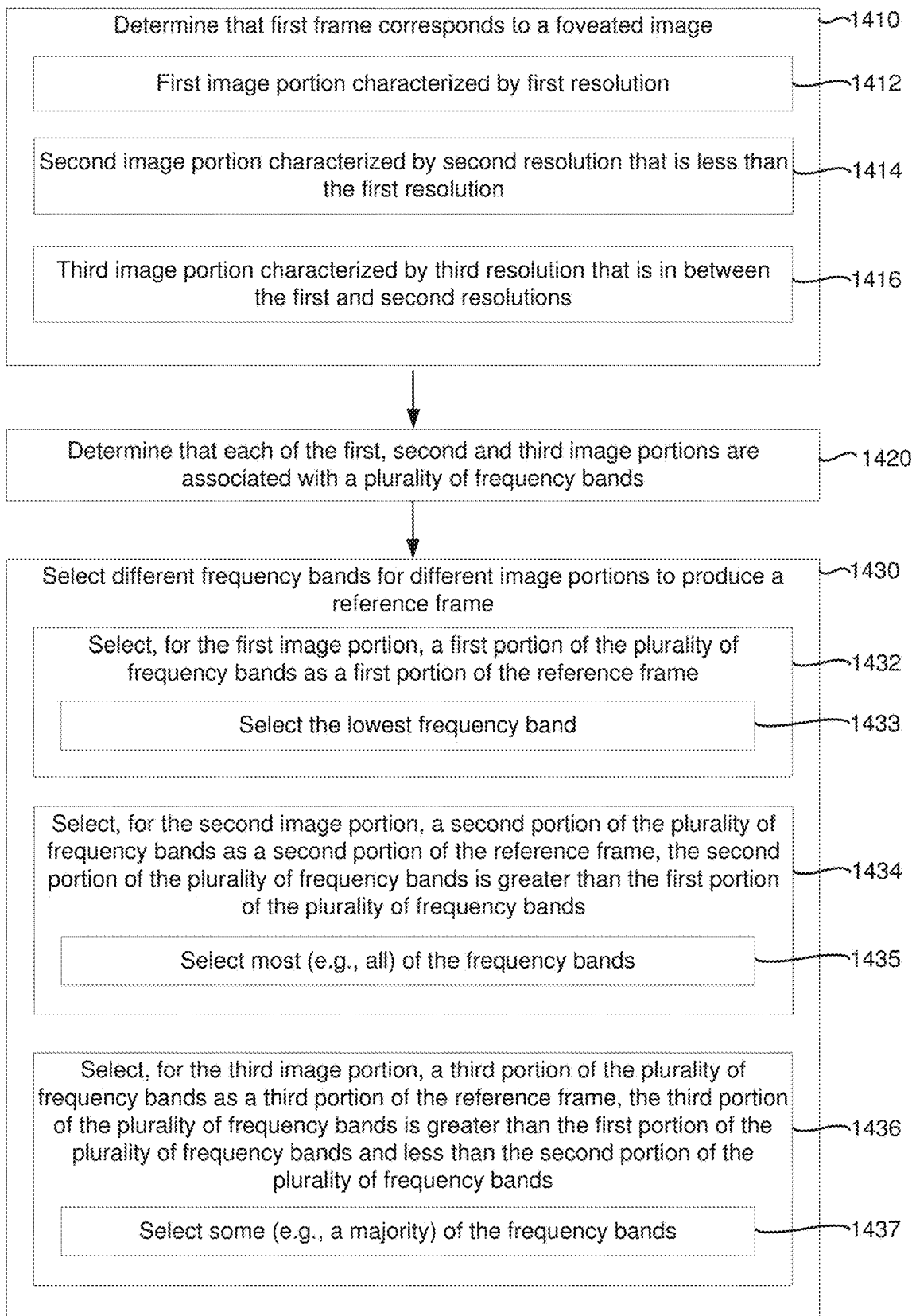
FIG. 14 is a flowchart representation of a method of down-converting a frame that corresponds to a foveated image in accordance with some implementations.

FIG. 14 is a flowchart representation of a method 1400 of down-converting a frame that corresponds to a foveated image in accordance with some implementations. In various implementations, the method 1400 is performed by an HMD with a display, a non-transitory memory, and one or more processors (e.g., the HMD 300 shown in FIGS. 1, 3 and 4). In some implementations, the method 1400 is performed by processing logic, including hardware, firmware, software, or a combination thereof. In some implementations, the method 1400 is performed by a processor executing code stored in a non-transitory computer-readable medium (e.g., a memory). Briefly, in some implementations, the method 1400 includes determining that a first frame corresponds to a foveated image with different image portions characterized by different resolutions, determining that each image portion is associated with various frequency bands, and selecting different frequency bands for different image portions to produce a reference frame.

As represented by block 1410, in various implementations, the method 1400 includes determining that a first frame (e.g., the first frame 360a shown in FIG. 4A) corresponds to a foveated image that includes different image portions characterized by different resolutions. As represented by block 1412, in some implementations, the foveated image includes a first image portion (e.g., the innermost region 1213 shown in FIG. 12) characterized by a first resolution (e.g., the first resolution 364a shown in FIG. 4A). As represented by block 1414, in some implementations, the foveated image includes a second image portion (e.g., corner regions 1202, 1205, 1222 and 1225 shown in FIG. 12) characterized by a second resolution that is less than the first resolution (e.g., the second resolution 364b shown in FIG. 4A). As represented by block 1416, in some implementations, the foveated image includes a third image portion (e.g., regions 1212, 1214 and 1215 shown in FIG. 12) characterized by a third resolution that is in between the first and second resolutions (e.g., the third resolution is less than the first resolution and greater than the second resolution).

As represented by block 1420, in some implementations, the method 1400 includes determining that each of the first, second and third image portions are associated with a plurality of frequency bands (e.g., the frequency bands 1106 shown in FIG. 11, for example, LLLL, LLHL, LLLH, LLHH, HL, LH and HH).

As represented by block 1430, in various implementations, the method 1400 includes selecting different frequency bands for different image portions to produce a reference frame (e.g., the reference frame 362a shown in FIG. 4A). As represented by block 1432, in some implementations, the method 1400 includes selecting, for the first image portion, a first portion of the plurality of frequency bands as a first portion of the reference frame. For example, as represented by block 1433, in some implementations, the method 1400 includes selecting, for the first image portion, the lowest frequency band as the first portion of the reference frame (e.g., selecting the LLLL frequency band for the innermost region 1213 shown in FIG. 13).

As represented by block 1434, in some implementations, the method 1400 includes selecting, for the second image portion, a second portion of the plurality of frequency bands as a second portion of the reference frame. In some implementations, the second portion of the plurality of frequency bands is greater than the first portion of the plurality of frequency bands. For example, as represented by block 1435, in some implementations, the method 1400 includes selecting, for the second image portion, most (e.g., all) of the frequency bands as the second portion of the reference frame (e.g., selecting the LLLL, LLHL, LLLH, LLHH, HL, LH and HH frequency bands for the corner regions 1201, 1205, 1221 and 1225 shown in FIG. 13).

As represented by block 1436, in some implementations, the method 1400 includes selecting, for the third image portion, a third portion of the plurality of frequency bands as a third portion of the reference frame. In some implementations, the third portion of the plurality of frequency bands is greater than the first portion of the plurality of frequency bands and less than the second portion of the plurality of frequency bands. For example, as represented by block 1437, in some implementations, the method 1400 includes selecting, for the third image portion, some (e.g., a majority) of the frequency bands as the third portion of the reference frame (e.g., selecting the LLLL, LLLH and LHL frequency bands for the regions 1211 and 1215).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at an electronic device including a display, a non-transitory memory, and one or more processors coupled with the display and the non-transitory memory:
separately receiving, over a communication channel, a plurality of frequency bands of an image;
generating a reference image, wherein at least a first portion of the reference image is based on a first set of the plurality of frequency bands;
storing the reference image in the non-transitory memory;
generating a display image, wherein at least a first portion of the display image corresponding to the first portion of the reference image is based on a second set of the plurality of frequency bands, wherein the second set of the plurality of frequency bands includes the first set of the plurality of frequency bands and at least one additional frequency band of the plurality of frequency bands; and
displaying the display image on the display.

2. The method of claim 1, wherein separately receiving the plurality of frequency bands of the image includes receiving a plurality of separately encoded frequency bands of the image.

3. The method of claim 1, wherein separately receiving the plurality of frequency bands of the image includes separately receiving the plurality of frequency bands with different transmission priorities.

4. The method of claim 1, wherein the first set includes a low frequency band and the at least one additional frequency band includes a high frequency band.

5. The method of claim 1, wherein the first set includes an LLLL frequency band and the second set includes all the plurality of frequency bands.

6. The method of claim 1, wherein a second portion of the reference image is based on all of the plurality of frequency bands, wherein a second portion of the display image corresponding to the second portion of the reference image is based on all of the plurality of frequency bands.

7. The method of claim 1, wherein a second portion of the reference image is based on a third set of the plurality of frequency bands including the first set of the plurality of frequency bands and at least one additional frequency band of the plurality of frequency bands, wherein a second portion of the display image corresponding to the second portion of the reference image is based on a fourth set of the plurality of frequency bands including the third set of the plurality of frequency bands and at least one additional frequency band of the plurality of frequency bands.

8. The method of claim 7, wherein the first set includes an LLLL frequency band, the second set includes all of the plurality of frequency bands, the third set includes the LLLL frequency band and at least one additional frequency band of the plurality of frequency bands, and the fourth set includes all of the plurality of frequency bands.

9. The method of claim 7, wherein a third portion of the reference image is based on all of the plurality of frequency bands, wherein a third portion of the display image corresponding to the third portion of the reference image is based on all of the plurality of frequency bands.

10. The method of claim 7, wherein the first set and the third set are selected to maintain a constant resolution throughout the reference image.

11. The method of claim 1, further comprising:
separately receiving, over the communication channel, a second plurality of frequency bands of a second image; and
performing an error correction operation on the second image based on the reference image stored in the non-transitory memory.

12. A device comprising:
one or more processors;
a non-transitory memory;
a display; and
one or more programs stored in the non-transitory memory, which, when executed by the one or more processors, cause the device to:
separately receive, over a communication channel, a plurality of frequency bands of an image;
generate a reference image, wherein at least a first portion of the reference image is based on a first set of the plurality of frequency bands;
store the reference image in the non-transitory memory;
generate a display image, wherein at least a first portion of the display image corresponding to the first portion of the reference image is based on a second set of the plurality of frequency bands, wherein the second set of the plurality of frequency bands includes the first set of the plurality of frequency bands and at least one additional frequency band of the plurality of frequency bands; and
display the display image on the display.

13. The device of claim 12, wherein the first set includes a low frequency band and the at least one additional frequency band includes a high frequency band.

14. The device of claim 12, wherein the first set includes an LLLL frequency band and the second set includes all the plurality of frequency bands.

15. The device of claim 12, wherein a second portion of the reference image is based on all of the plurality of frequency bands, wherein a second portion of the display image corresponding to the second portion of the reference image is based on all of the plurality of frequency bands.

16. The device of claim 12, wherein a second portion of the reference image is based on a third set of the plurality of frequency bands including the first set of the plurality of frequency bands and at least one additional frequency band of the plurality of frequency bands, wherein a second portion of the display image corresponding to the second portion of the reference image is based on a fourth set of the plurality of frequency bands including the third set of the plurality of frequency bands and at least one additional frequency band of the plurality of frequency bands.

17. The device of claim 16, wherein the first set includes an LLLL frequency band, the second set includes all of the plurality of frequency bands, the third set includes the LLLL frequency band and at least one additional frequency band of the plurality of frequency bands, and the fourth set includes all of the plurality of frequency bands.

18. The device of claim 16, wherein a third portion of the reference image is based on all of the plurality of frequency bands, wherein a third portion of the display image corresponding to the third portion of the reference image is based on all of the plurality of frequency bands.

19. The device of claim 12, wherein the one or more programs stored in the non-transitory memory, when executed by the one or more processors, further cause the device to:

separately receive, over the communication channel, a second plurality of frequency bands of a second image; and perform an error correction operation on the second image based on the reference image stored in the non-transitory memory.

20. A non-transitory memory storing one or more programs, which, when executed by one or more processors of a device with a display, cause the device to:

separately receive, over a communication channel, a plurality of frequency bands of an image;

generate a reference image, wherein at least a first portion of the reference image is based on a first set of the plurality of frequency bands;

store the reference image in the non-transitory memory;

generate a display image, wherein at least a first portion of the display image corresponding to the first portion of the reference image is based on a second set of the plurality of frequency bands, wherein the second set of the plurality of frequency bands includes the first set of the plurality of frequency bands and at least one additional frequency band of the plurality of frequency bands; and display the display image on the display.

* * * * *